(12) United States Patent
Eyben et al.

(10) Patent No.: US 12,424,207 B2
(45) Date of Patent: Sep. 23, 2025

(54) COMMUNICATION SYSTEM AND RELATED METHODS

(71) Applicant: audEERING GmbH, Gilching (DE)

(72) Inventors: Florian Eyben, Gilching (DE); Simone Hantke, Gilching (DE); Stephan Huber, Gilching (DE); Andreas Triantafyllopoulos, Gilching (DE); Björn Schuller, Gilching (DE)

(*) Notice: Subject to any disclaimer, the term of this patent is extended or adjusted under 35 U.S.C. 154(b) by 322 days.

(21) Appl. No.: 18/053,930

(22) Filed: Nov. 9, 2022

(65) Prior Publication Data

US 2023/0154457 A1     May 18, 2023

(30) Foreign Application Priority Data

Nov. 12, 2021 (EP) .................................... 21207958

(51) Int. Cl.
    *G10L 15/22*     (2006.01)
    *G10L 15/06*     (2013.01)
    *G10L 15/18*     (2013.01)
    *G10L 25/63*     (2013.01)

(52) U.S. Cl.
CPC ........ *G10L 15/1815* (2013.01); *G10L 15/063* (2013.01); *G10L 15/22* (2013.01); *G10L 25/63* (2013.01); *G10L 2015/0635* (2013.01)

(58) Field of Classification Search
CPC .......................... G10L 15/1815; G10L 15/063
See application file for complete search history.

(56) References Cited

U.S. PATENT DOCUMENTS

2009/0240488 A1    9/2009   White et al.
2019/0253558 A1*   8/2019   Haukioja ................ G10L 15/22

OTHER PUBLICATIONS

Dow S.P. et al: "Shepherding the crowd yields better work", CSCW, Seattle, WA, USA, Feb. 11-14, 2012 (11 pages).
Jia Yanan et al: "A deep learning system for sentiment analysis of service calls"—XP 81650132A (10 pages).

* cited by examiner

*Primary Examiner* — Ibrahim Siddo

(57) ABSTRACT

Communication system and related methods, in particular a method of operating a communication system is disclosed. The method comprises obtaining audio data representative of one or more voices, the audio data including first audio data of a first voice; obtaining first voice data based on the first audio data; wherein obtaining first voice data comprises applying a voice model on the first audio data; wherein the first voice data includes first speaker metric data; outputting a first voice representation indicative of the first voice data; obtaining first voice validation data, based on the first voice representation, from a first validator; obtaining second voice validation data, based on the first voice representation, from a second validator; determining an agreement metric based on the first voice validation data and the second voice validation data; determining a first validation score based on the agreement metric; and outputting the first validation score.

20 Claims, 4 Drawing Sheets

COMMUNICATION SYSTEM AND RELATED METHODS

The present disclosure relates to speech processing and related tools and methods, and systems in particular for analysing, monitoring, coaching, and/or evaluating speech of one or more speakers, for example a caller and/or an agent of a call and/or one or more participants of a telephone conversation or a meeting, such as an online meeting. Thus, a communication system, an electronic device, and related methods, in particular a method of operating a communication system.

BACKGROUND

Today the interaction between people is increasingly taking place at a distance and virtually, e.g., via telephone calls, conference calls, and the like. However, it may be difficult for people speaking to each other on each side of a telephone call, to grasp emotions or sentiments of the other party by just listening to a speech. The voice and/or speech competences of people is becoming more and more important.

For example, almost all support and after sales is performed over the phone between call center agents initiating and/or answering the calls and potential customers being contacted or customers contacting call center agents with various issues. Call center agents working at call centers, support center, or contact centers struggle with a job that can at time be monotonous and repetitive. This represents a negative experience for the agents, but it also leads to a worse tone performance, and in turn a lower customer satisfaction for the customers on the other end of the line and on average, longer calls. After taking calls for many hours, it can be difficult to remember that there is a human being on the other side of the call, who are longing for help to solve a problem. Furthermore, it may also be difficult for a speaker to improve his/her speech skills.

SUMMARY

Accordingly, there is a need for communication systems, electronic devices, and methods of operating a communication system having improved validation of voice data.

A method of operating a communication system is disclosed. The method comprises obtaining audio data representative of one or more voices, the audio data including first audio data of a first voice. The method comprises obtaining first voice data based on the first audio data. Obtaining first voice data comprises applying a voice model on the first audio data. The first voice data includes first speaker metric data. The method comprises outputting a first voice representation indicative of the first voice data. The method comprises obtaining first voice validation data, based on the first voice representation, from a first validator. The method comprises obtaining second voice validation data, based on the first voice representation, from a second validator. The method comprises determining an agreement metric based on the first voice validation data and the second voice validation data. The method comprises determining a first validation score based on the agreement metric. The method comprises outputting the first validation score.

An advantage of the present disclosure is that an improved voice model is provided. Further, an advantage of the present disclosure is that methods and tools with improved validation of voice models are provided. In turn, a more accurate voice model may be provided. It may be appreciated that the present disclosure may reduce the amount of data required for providing and/or updating a voice model, and in turn reduce resource-intense computations for providing and/or updating a voice model. Further, the present disclosure may provide shorter cycles of model update and/or faster obtaining (such as retrieval) of voice validation data (such as annotated data). For example, voice validation data may be obtained directly during runtime of a client application (e.g., a client application running the voice model), which allows faster obtaining of voice validation data compared to offline collection of audio data. For example, in offline collection of audio data post-processing it may require creating a database, sending to one or more validators (such as annotators), and balancing data which is time consuming.

It may be appreciated that an advantage of the present disclosure is that an improved validation assessment may be provided, in turn providing an improved self-assessment of a validator/user (e.g., by providing a validation score). The present disclosure may provide a more honest validation/annotation of voice data. This may in turn help a validator/user improving his speech skills. The present disclosure may provide an improved understanding of the similarities between two validators, e.g., based on the agreement metric.

An advantage of the present disclosure is that it may improve the speech and/or the voice competences of users/validators, and in turn improve the customer satisfaction of the customers that the users speak to. The present disclosure may also improve the efficiency of conversations and/or calls, leading e.g. to shorter and more efficient conversations/calls. The present disclosure may also provide a development path or area for the users to improve their skills and/or competences in time, e.g., helping users to reach and/or improve their key performance indicators, KPIs. The present disclosure may improve follow-up for the users. Additionally, the present disclosure may provide a personalized/customized feedback to a user/validator.

Furthermore, an improved feedback on a user's performance or on the outcome of a conversation may be provided. The present disclosure may identify, demonstrate, or diagnose deficiencies and/or strengths of the voice of the user. Further, the present disclosure may correlate improvements in the voices of users with improvements in customer satisfaction. The present disclosure may for example increase the engagement of a user in his/her work, e.g., by being able to visualize an improvement of performances. The present disclosure may for example increase the motivation of the user and give an incentive or a motivational factor to improve performance and/or user feedback. The user may improve his/her speaking capabilities, e.g., improving consistency during the day by keeping a positive/great tone with a negative speaker, avoid poor speech performance, such as interruptions, long pauses, monotony, and/or speaking rate.

It is an advantage of the present disclosure that a speaker/user is able to monitor/evaluate a conversation, a customer, and/or a meeting, in turn allowing the speaker/user to accommodate or adapt the speaker's speech, such as tone of the speech, to improve his/her performance during a conversation. This may improve an outcome of a presentation by the speaker and/or an outcome of a conversation or meeting between the speaker and one or more other speakers. The speaker may further have an improved understanding of a conversation and/or of the other speaker, e.g., a better grasp of sentiments and/or emotions of the other speaker.

Further, a communication system is disclosed, the communication system comprising an electronic device configured to perform any of the methods according to this disclosure. The electronic device comprises an interface, a processor, and a memory.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
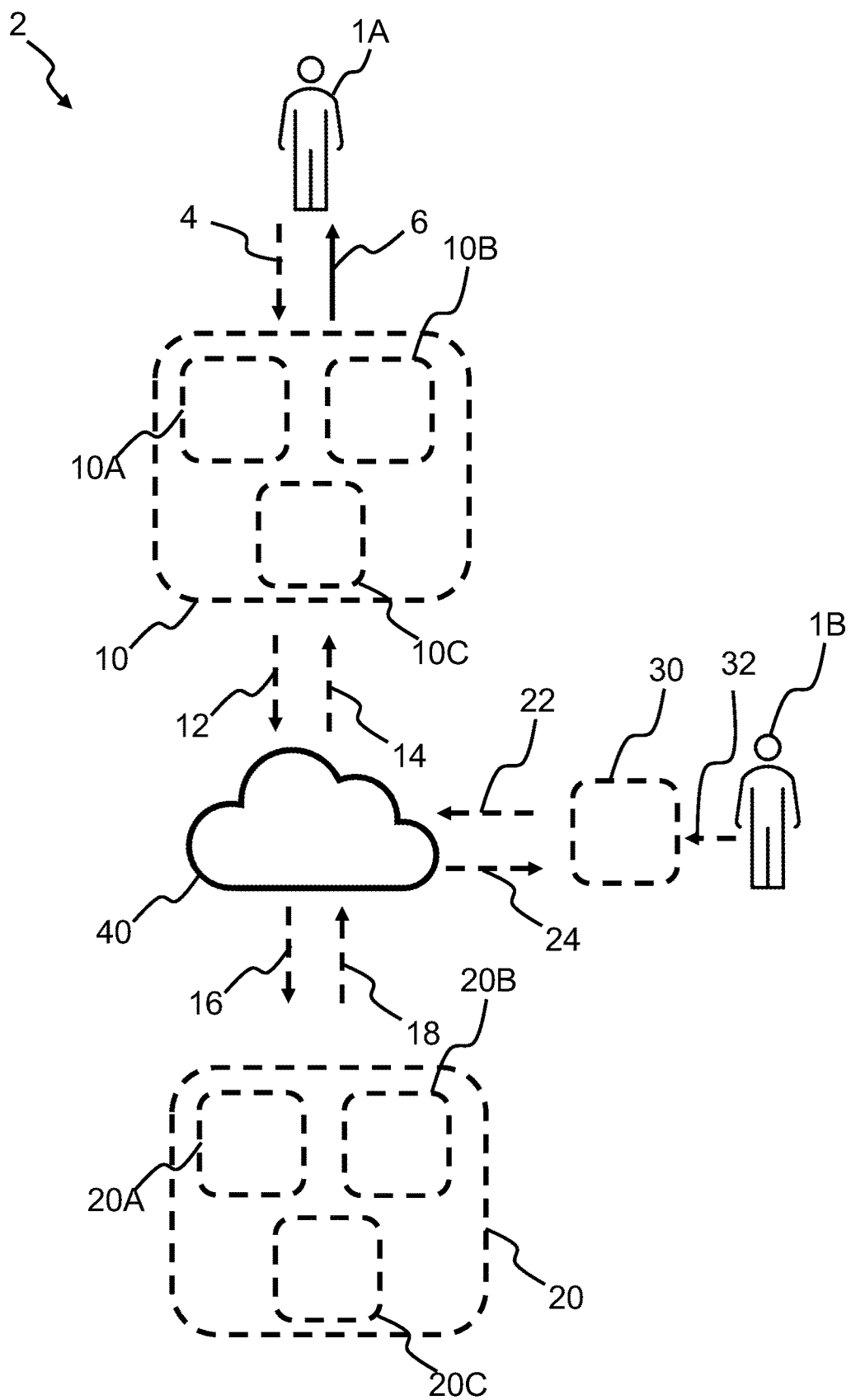
FIG. 1 schematically illustrates an exemplary communication system according to the present disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method of operating a communication system is disclosed. The communication system may optionally comprise a training module comprising an interface, a processor, and a memory. The communication system may optionally comprise a server device comprising an interface, one or more processors, and a memory. The communication system may be a system for training and/or coaching one or more users, e.g., the voice and/or speech of one or more users. The communication system may be a system for performing, monitoring, handling, and/or analysing audio data representative of one or more voices, e.g., comprising one or more audio signals including audio signal(s) of one or more speakers talking, e.g., as a monologue or a conversation, such as a meeting conversation, a video/telephone conference conversation, or a call, e.g., a telephone or VoIP call. The system may be a system for performing, monitoring, handling, and/or analysing one or more audio signals, such as a monologue of a speaker or a conversation, e.g., between two or more people/speakers, such as a conversation in a phone call or a meeting. The communication system may for example be part of, comprise, or act as a call center system for monitoring, handling, and/or analysing one or more audio signals, such as a monologue of a speaker or conversations between two or more people, e.g., a phone call between an agent of the call center system and a customer or caller.

The communication system may optionally comprise an electronic device. The electronic device may comprise an interface, a processor, and a memory. The electronic device may for example be or comprise a mobile phone, such as a smartphone, a computer, such as a laptop computer or PC, or a tablet computer. The electronic device may for example be a user device, such as a mobile phone or a computer, configured to perform a call between a user and one or more persons. The electronic device may be configured to obtain audio data, e.g., comprising first audio input, such as first audio input from a first voice. The audio data may be obtained from a call between the user and another person. For example, the electronic device may act as call agent device where the user may be an agent, such as an agent of a call center, such as a support call center, an after sales call center, a marketing call center, a reception call center, or a sales call center. The electronic device may for example be a user device, such as a mobile phone or a computer, configured to record first audio input from a first speaker, such as record the first speaker speaking or talking. The electronic device may be configured to obtain audio data, e.g., comprising one or more audio signals, such as generate one or more audio signals, including first audio data, e.g., comprising a first audio signal. The first audio signal may be based on the first audio input.

The method comprises obtaining audio data, also denoted AD, representative of one or more voices. The audio data includes first audio data, also denoted AD_1, of a first voice, also denoted V_1. The first voice V_1 may be seen as the voice of a first speaker, such as a user of the communication system. The first voice V_1 may be seen as the voice of a user of the electronic device.

The audio data AD, may comprise one or more audio signals, also denoted AS_i, i=1, 2, . . . N, where N is the number of speakers/audio signals, over time. The one or more audio signals may include a first audio signal, also denoted AS_1, of a first voice. The first voice may be a voice of a first voice communication of the first speaker and/or a plurality of voice communications of the first speaker. The first audio signal may be representative of first speech/voice of a first speaker of a first conversation. The first speaker may be a caller, an agent, or a first participant in a telephone conversation or a meeting, e.g., comprising the first conversation and/or a plurality of conversations, such as where the first conversation and/or the plurality of conversations take place. The one or more audio signals optionally include a second audio signal, also denoted AS_2. The second audio signal may be representative of a second speech/voice of a second speaker of the first conversation and/or of a plurality of conversations. The second speaker may be a caller, an agent, an interviewer, or a second participant in a telephone conversation or a meeting, e.g., comprising the first conversation, such as where the first conversation takes place. The first audio data may comprise one or more first segments, such as first audio segments, e.g., comprising the first voice. The first audio data may comprise at least 5 audio segments of the first voice, at least 20 audio segments of the first voice, at least 50 audio segments of the first voice, and/or at least 100 audio segments of the first voice. The first audio data may comprise one or more recordings (such as audio captures) of one or more conversations between at least two parties. The first audio data may comprise one or more recordings from a call center, such as recordings from call center conversations.

Obtaining audio data may comprise obtaining one or more audio inputs from one or more conversations performed by a speaker/user, such as a first audio input from one or more conversations performed by the first speaker/user. In other words, the first audio data may be based on the first audio input. The first audio data may be obtained from a call or conversation between the user and another person, e.g., a first call or the first conversation and/or of a plurality of conversations performed by the first speaker/user. The first speaker may be the person speaking/talking the most during the first call and/or the first conversation. The first speaker may be the first person speaking during the first call and/or first conversation and/or during a plurality of conversations. The first speaker may be a person of interest, such as a user that may be voice coached and/or trained. The first audio data may be obtained from the electronic device, e.g., recording the first voice, such as first audio input from a first speaker. The first audio data may comprise one or more recorded segments from one or more conversations. For example, recording the first speaker speaking or talking. Obtaining audio data may comprise generating first audio data of a first voice. Obtaining audio data may comprise generating one or more audio signals, including the first audio signal. The first audio signal may be based on the first audio input. The first audio signal may comprise a first speaker audio signal. The first audio signal may be an agent audio signal or a caller audio signal, and a second audio signal is the other.

The method comprises obtaining voice data, also denoted VD, based on the audio data AD. The method may comprise obtaining first voice data, also denoted VD_1, based on the first audio data AD_1. The first voice data VD_1 may comprise data indicative of the first voice, e.g., of the first speaker. Obtaining first voice data may comprise generating first voice data of a first voice based on the first audio data. The first voice data may be first agent voice data, such as first voice data of a first user/agent of the communication system. The first voice data may comprise speaker metric data, also denoted SPMD. The voice data may be logged and/or saved on a memory. The voice data may comprise a time-stamp, a date, a type of event, and/or audio of the voice. The voice data may comprise one or more spectrograms of the first voice.

The method comprises applying a voice model, also denoted VM, on the first audio data AD_1. The voice model VM may be seen as an initial voice model. In other words, the method may comprise to apply a machine learning, ML, model to predict one or more paralinguistic metrics based on the first audio data. The one or more paralinguistic metrics may be seen as an output of the ML model. The voice model VM may comprise a neural network. The inputs to the ML model may be speaker features or the audio signal itself. A speaker feature may comprise one or more of: spectrograms, Mel-Frequency Cepstral Coefficients, MFCCs, pitch, formant, jitter, shimmer features. and any combination of the previous and their time derivatives and/or statistical functionals over time. Statistical functionals may comprise one or more of minimum, maximum, mean, median, and standard deviation. A ML model may comprise a Linear Regression Model, a Support-Vector-Machine, a Decision Tree Classifier (e.g., Random Forest, XGBoost), a Gaussian Mixture Model, a Hidden Markov Model, and/or a Neural Network. A Neural Network may for example comprise one or more of a linear feed forward layer, a convolutional layer, a recurrent layer, and an attention layer. A ML model may comprise a weighting of one or more speaker features. For example, the ML model may map e.g., a speaker intonation and/or a voice quality to a paralinguistic metric, such as a tone metric and/or a sentiment metric. For example, the ML model may map e.g., a speaker intonation and/or a voice quality to a paralinguistic metric, such as a sentiment metric/type, a sentiment level, and/or a sentiment confidence score. A ML model may comprise parameters in the range of 100,000 parameters to 1,000,000,000 parameters, e.g., 500,000 to 100,000,000 parameters. A ML model may comprise layers in the range of 5 layers to 50 layers, e.g., 10 layers to 15 layers. For example, an ML model may be a CNN and comprise 15,000,000 parameters and 30 layers. Applying a voice model VM on the first audio data AD_1 may comprise one or more steps of pre-processing. For example, applying the voice model VM on the first audio data may comprise performing one or more of noise reduction, gain normalisation and feature extraction on the first audio data. For example, applying the voice model VM on the first audio data may comprise performing one or more of noise reduction, gain normalisation and feature extraction on the audio signal, such as the first audio signal AS_1.

In one or more exemplary methods, obtaining voice data based on the audio data comprises determining speaker metric data, also denoted SPMD, of a speaker based on the audio data. In one or more exemplary methods, obtaining first voice data VD_1 based on the first audio data AD_1 comprises determining first speaker metric data, also denoted SPMD_1, of a first speaker, also denoted SP_1, based on the first audio data AD_1. In other words, the first voice data VD_1 includes first speaker metric data SPMD_1. The first speaker SP_1 may have and/or output the first voice V_1. The first speaker metric data SPMD_1 may include first primary speaker metric data SPMD_1_1. The first speaker metric data SPMD_1 may comprise one or more voice parameters/characteristics of the first voice. In one or more exemplary methods, the first speaker metric data SPMD_1 comprises one or more paralinguistic metrics. The one or more paralinguistic metrics may include one or more of a tone metric, a sentiment metric, an activation, a valence, a dominance, and an emotional tone. A paralinguistic metric may be seen as a speaker metric. A paralinguistic metric may comprise a score, such as a first speaker/voice score, e.g., a paralinguistic metric score. For example, when the voice model VM predicts a paralinguistic metric indicative of arousal, the paralinguistic metric may comprise a paralinguistic metric score a paralinguistic metric score in the range of −1 to 1, where −1 is indicative of no arousal and 1 is indicative of high arousal. It may be determined that when the paralinguistic metric score is above or equal to 0.5 the arousal is high. The first speaker metric data may comprise one or more of a speaking tone parameter (such as tone metric data), a speech trait parameter (such as speech trait data), a sentiment parameter, and a vocal trait parameter (such as vocal trait data) of one or more speakers, such as the first speaker. In other words, the first speaker metric data may comprise one or more of a tone metric, a speech trait metric, a sentiment metric, and a vocal trait metric of one or more speakers, such as the first speaker. The first speaker metric data may comprise a first speaker/voice score. In other words, determining the first speaker metric data may comprise determining a first speaker/voice score based on the first audio data. The first speaker score may be determined based on one or more of the tone metric, the speech trait metric, the sentiment metric, and the vocal trait metric. For example, a general first speaker score for the first speaker may be determined based on the first speaker metric data. Alternatively or additionally, a first speaker score may be determined for each of the speaker metrics, e.g., for the tone metric, the speech trait metric, the sentiment metric, and the vocal trait metric. A speech trait parameter (such as speech trait data) may for example comprise and/or be indicative of one or more of enthusiasm, friendliness, professionalism, a lack of enthusiasm, a lack of friendliness, a lack of empathy, and a lack of professionalism of the first speaker, e.g., in the first voice. A vocal trait parameter (such as vocal trait data) may for example comprise and/or be indicative of one or more of a monotonous voice, an unpleasant speaking rate, an unpleasant variation in intonation, an unclear pronunciation, a changing voice, a pleasant speaking rate, and/or a clear pronunciation of the first speaker, e.g., in the first voice. A speaking tone parameter (such as tone metric data) may for example comprise and/or be indicative of one or more of a positive speaking tone, a satisfied speaking tone, a service-minded tone, an enthusiastic tone, a helpful tone, a negative speaking tone, a dissatisfied speaking tone, a worried tone, a bored tone, and/or an afraid tone of the first speaker, e.g., in the first voice.

The speaker metric data SPMD may comprise one or more speaker metrics over time, e.g., one or more first speaker metrics over time. In other words, determining speaker metric data SPMD may comprise determining one or more speaker metrics SM over time, e.g., over a conversation. Determining first speaker metric data SPMD_1 may comprise determining one or more first speaker metrics SPM_1 over time, e.g., over the first conversation or a first recording of the first speaker.

Determining first speaker metric data SPMD_1 may comprise determining first primary speaker metric data, also denoted SPMD_1_1. Determining first primary speaker metric data SPMD_1_1 may comprise determining one or more first primary speaker metrics SPM_1_1 over time, e.g., over the first conversation or a first recording of the first speaker. In other words, the first speaker metric data SPMD_1 may comprise first primary speaker metric data SPMD_1_1. Further, the first speaker metric data may comprise or be indicative of one or more of the first primary speaker metric data SPMD_1_1 comprising one or more first primary speaker metrics, first secondary speaker metric data SPMD_1_2 comprising one or more first secondary speaker metrics, and first tertiary speaker metric data SPMD_1_3 comprising one or more first tertiary speaker metrics. In other words, determining whether the first voice data satisfies a first validation criterion may comprise determining whether the first speaker metric data SPMD satisfies the first validation criterion, e.g., whether the first speaker metric data SPMD_1 satisfies the first validation criterion. For example, determining whether the first voice data satisfies a first validation criterion may comprise determining whether a first speaker metric SPM_1 satisfies the first validation criterion. In other words, determining whether the first voice data satisfies a second validation criterion may comprise determining whether the first speaker metric data SPMD satisfies the second validation criterion, e.g., whether the first speaker metric data SPMD_1 satisfies the second validation criterion. For example, determining whether the first voice data satisfies a second validation criterion may comprise determining whether a first speaker metric SPM_1 satisfies the second validation criterion.

In one or more exemplary methods, the first primary speaker metric data comprises sentiment metric data. Determining first primary speaker metric data SPMD_1_1 may comprise determining sentiment metric data, also denoted SMD. In one or more exemplary methods, determining first primary speaker metric data SPMD_1_1 may comprise determining one or more first sentiment metrics, also denoted SM_1_$i$, i=1, 2, ..., M, where M is the number of first sentiment metrics. In other words, the sentiment metric data SMD may comprise one or more first sentiment metrics over time.

A sentiment metric is indicative of a sentiment state of a speaker. Sentiment metric data SMD may be indicative of a mean sentiment of a speaker over a conversation and/or a portion of a conversation. In one or more exemplary methods, the sentiment metric data SMD may be indicative of one or more sentiment metrics over time. For example, the sentiment metric data SMD may be indicative of a series of sentiment levels, e.g., one sentiment level per conversation turn. A sentiment metric may comprise one or more of a sentiment type identifier, sentiment level(s), and a confidence score. In other words, determining whether the first voice data satisfies a first validation criterion may comprise determining whether the first sentiment data satisfies the first validation criterion.

The one or more first sentiment metrics, such as SM_1_1 and/or SM_1_2, are indicative of a first speaker state, i.e., one or more first sentiment states of the first speaker, and may be based on the first audio data, such as based on first audio signal and/or the second audio signal. The one or more first sentiment metrics SM_1_$i$ may comprise one or more parameters indicative of the first speaker state.

The one or more first sentiment metrics SM_1_$i$ may include a first primary sentiment metric, also denoted SM_1_1, indicative of a primary sentiment state of a first speaker. In other words, SM_1_1 may be indicative of a primary emotion of the first speaker. SM_1_1 may be indicative of a dominating sentiment state and/or a first sentiment state in time of the first speaker. The primary sentiment state may be one of disappointed, bored, afraid, sad, negative, very negative, dissatisfied, angry, surprised, worried, wondering, don't understanding, thinking, neutral, positive, very positive, glad, friendly, confident, excited, pleased, satisfied, aroused, content, relaxed, energetic, enthusiastic, and happy. In one or more exemplary methods/ systems, the primary sentiment state of the first speaker may be selected from a primary set of sentiment states.

A first sentiment metric SM_1_$i$ may comprise a first sentiment type identifier, also denoted ST_ID_1_$i$, where i is an index, and i=1, 2, ... H, where H is the number of first sentiment type identifiers. In other words, determining one or more first sentiment metrics SM_1_$i$ may comprise determining a first sentiment type identifier ST_ID_1_$i$, e.g., a first primary sentiment type identifier ST_ID_1_1 of the first primary sentiment metric SM_1_1. A sentiment type identifier is indicative of a sentiment state of a speaker.

A sentiment type identifier may for example be a label, a number or value, such as an integer, corresponding to a specific sentiment (state), a sentiment type and/or a sentiment class. For example, ST_ID_1_$i$ may respectively be selected from the same or different sets of sentiment type identifiers. For example, ST_ID_1_1 may be selected from a primary set of sentiment type identifiers and/or ST_ID_1_2 may be selected from a secondary set of sentiment type identifiers. The primary set of sentiment type identifiers may be different from or the same as the secondary set of sentiment type identifiers. The primary set of sentiment type identifiers and the secondary set of sentiment type identifiers may share one or more, such as a plurality of, sentiment type identifiers.

In one or more exemplary methods, the first primary sentiment metric SM_1_1 comprises a first primary sentiment type identifier ST_ID_1_1 selected from a primary set of sentiment type identifiers ST_ID_SET_1, where ST_ID_SET_1 comprises a plurality of sentiment type identifiers, e.g., including at least three, four, five or more sentiment type identifiers.

In one or more exemplary methods, the primary set of sentiment type identifiers ST_ID_SET_1 is given by:

$$ST\_ID\_SET\_1=\{1,2,3,4,5\},$$

where "1" is indicative of a sentiment, such as "Very negative", "2" is indicative of a sentiment, such as "Negative", "3" is indicative of a sentiment, such as "Neutral", optional "4" is indicative of a sentiment, such as "Positive", and optional "5" is indicative of a sentiment, such as "Very positive".

In one or more exemplary methods, the primary set of sentiment type identifiers ST_ID_SET_1 is given by:
  ST_ID_SET_1={"Very negative", "Negative", "Neutral", "Positive", "Very positive"},
  e.g., where "Very negative" and/or "Very positive" is optional.

A set of sentiment type identifiers, such as the primary set of sentiment type identifiers and/or the secondary set of sentiment type identifiers, may comprise at least three or at least four different sentiment type identifiers, such as five, six, seven, eight, nine, or more sentiment type identifiers. In other words, each sentiment or sentiment type may have a corresponding ST_ID_1_$i$. For example, the first primary sentiment metric SM_1_1 may comprise a first primary sentiment type identifier ST_ID_1_1 indicative of or corresponding to the primary sentiment state or the first speaker state being "positive".

A first sentiment metric SM_1_$i$ may comprise a sentiment level, also denoted SL_1_$i$, $i=1, 2, \ldots, 0$, where 0 is the number of sentiment levels. In other words, determining SM_1_$i$ may comprise determining SL_1_$i$, e.g., determining SM_1_1 may comprise determining a first primary sentiment level SL_1_1. A sentiment level SL_1_$i$ may indicate a level of the $i$'th sentiment type. In other words, SL_1_$i$ may indicate a degree of the $i$'th sentiment type. For example, when ST_ID_1_1 corresponds to the first speaker state "positive", a first primary sentiment level SL_1_1 may be indicative of or correspond to a degree of the sentiment "positive", e.g., at a scale, e.g., from 0 to 1 or from 1 to 10, or selected from "low", "medium", and "high". In other words, a sentiment level of a sentiment metric may be on a scale, e.g., from 0 to 1 or from 1 to 10.

A first sentiment metric SM_1_$i$ may comprise a confidence score, respectively denoted SCS_1_$i$, $i=1, 2, \ldots, P$, where P is the number of confidence scores. In other words, determining SM_1_$i$ may comprise determining a first confidence score SCS_1_$i$, e.g., determining first primary sentiment metric SM_1_1 may comprise determining a first primary confidence score SCS_1_1. A confidence score of a sentiment metric may be indicative of a score or a probability of the determined sentiment metric, e.g., sentiment type identifier and/or sentiment level, being correct, e.g., the sentiment state or sentiment type (as identified by the sentiment type identifier of the sentiment metric) being correct. For example, SCS_1_1=0.88 may be indicative of a probability of 88% that the determined ST_ID_1_1, e.g., being "positive", is correct.

Determining one or more first sentiment metrics indicative of a first speaker state may comprise extracting one or more speaker features from the first audio data, such as from the first audio signal, e.g., wherein the one or more first sentiment metrics are based on the one or more speaker features. The one or more speaker features may comprise paralinguistic features. The one or more speaker features may for example comprise a speaker tone feature, a speaker intonation feature, a speaker power or volume feature, a speaker pitch feature, a speaker quality feature, a speaker rate feature, and/or a speaker frequency feature.

In one or more exemplary methods, the one or more first sentiment metrics SM_1_$i$ includes a first secondary sentiment metric also denoted SM_1_2, indicative of a secondary sentiment state of the first speaker.

In one or more exemplary methods, the first secondary speaker metric data SPMD_1_2 is tone metric data, also denoted TMD. The tone metric data may comprise speaking tone data. Determining first secondary speaker metric data SPMD_1_2 may comprise determining tone metric data. In one or more exemplary methods, determining first secondary speaker metric data SPMD_1_2 may comprise determining one or more first tone metrics, also denoted TM_1_$i$, $i=1, 2, \ldots, m$, where m is the number of first tone metrics. In other words, the tone metric data TMD may comprise one or more first tone metrics over time, e.g., over the first conversation.

A tone metric may be indicative of a tone of a speaker. The first speaker metric data may comprise one or more first tone parameters, e.g., comprised in the tone metric data TMD. The one or more first tone parameters may be based on the one or more first tone metrics. For example, the tone metric data TMD may be indicative of, or comprise a first tone parameter being a mean tone of a speaker over a conversation, a time interval, and/or a tone outcome of a conversation (e.g., the overall tone of the speaker when the conversation. and/or speech turn is terminated). Tone metric data TMD may be indicative of a mean tone of a speaker over a conversation and/or a speech turn. In one or more exemplary methods, the tone metric data TMD may be indicative of one or more tone metrics over time. For example, the tone metric data SMD may be indicative of a series of tone levels, e.g., one tone level per conversation turn. Tone metric data TMD may comprise one or more speech metrics. In other words, the tone metric data may comprise one or more speech metrics e.g., interruptions, overtalks, long pauses, high or low speech rate, high or low intonation, turn or flip of a speaker (e.g., turning a customer from negative to positive or vice-versa), and/or responsiveness. The tone metric data may comprise count of events, e.g., count of one or more metrics.

In one or more exemplary methods, obtaining the first voice data VD_1 comprises determining first speaker metric data SPMD_1 indicative of one or more deficiencies of the first voice V_1. A deficiency may be seen as a difference from a target voice feature and/or profile of the first voice V_1.

In one or more exemplary methods, obtaining the first voice data VD_1 comprises determining first deficiency data, also denoted DD_1, indicative of one or more deficiencies of the first voice. In other words, obtaining the first voice data may comprise determining whether the first voice data, e.g., the first voice, comprises one or more deficiencies. A deficiency may be defined as voice data, such as a speaker metric and/or a voice metric where the first speaker/user is outside of a predetermined or defined range, threshold, and/or value. A deficiency may also be determined in terms of an event where the speaker/user did not perform as required or defined.

In one or more exemplary methods, determining whether the first voice data satisfies a first validation criterion comprises determining first deficiency data indicative of one or more deficiencies of the first voice. In one or more exemplary methods, determining whether the first voice data satisfies a second validation criterion comprises determining first deficiency data indicative of one or more deficiencies of the first voice. Obtaining first deficiency data may comprise identifying one or more speaker metrics and/or voice metrics where the first speaker performs below a defined standard.

In one or more exemplary methods, the deficiency data comprises one or more of a speaking tone deficiency, a speech trait deficiency, and a vocal trait deficiency. The first deficiency data may comprise one or more of a speaking tone deficiency, a speech trait deficiency, and a vocal trait deficiency of the first speaker. A speaking tone deficiency may for example comprise a negative speaking tone, a dissatisfied speaking tone, a worried tone, a bored tone, and/or an afraid tone. A speech trait deficiency may for example comprise a lack of enthusiasm, a lack of friendliness, and/or a lack of professionalism of the first speaker, e.g., in the first voice. A vocal trait deficiency may for example comprise a monotonous voice, an unpleasant speaking rate, and/or an unclear pronunciation.

In one or more exemplary methods, the method comprises outputting (such as determining, generating, storing, and/or transmitting) a first voice representation, also denoted VR_1, indicative of the first voice data VD_1. In one or more exemplary methods, the method comprises determining a first voice representation VR_1 indicative of the first voice data VD_1. The first voice representation VR_1 may be based on the first speaker metric data SPMD_1. The first voice representation VR_1 may be determined by using the voice model VM. In other words, the first voice representation may be based on an output of the voice model. The first voice representation may comprise a result of the voice model. The first voice representation may comprise an audio signal indicative of the first audio data. Outputting the first voice representation may comprise to play an audio signal (such as audio sample) indicative of the first audio data. Outputting the first voice representation may comprise one or more of displaying, showing, and storing the first voice representation. For example, outputting the first voice representation may comprise displaying the first voice representation on a display of the electronic device, e.g., to a user and/or a validator (such as the first validator and/or the second validator). The first voice representation may comprise a user interface including an output of the voice model to be validated by the validator, and the input to the voice model that the output was based on (such as the first audio data). A voice representation may be indicative of a segment, such as a speech segment or utterance, which is analysed. For example, a voice activity detection module may identify one or more segments of speech/voice and discard the noise. A segment may for example be a speech segment of at least 5 seconds or at least 10 seconds. The voice activity detection module may detect pauses longer than e.g., 400 ms, 500 ms, or 1 second. A speech segment may be detected when a pause occurs, when another speaker starts speaking, or when a segment reaches a defined maximum length (e.g., at most 8 seconds) may indicate the end of the speech segment. Determining the first voice representation VR_1 may comprise determining a first primary voice representation VR_1_1 based on the first primary speaker metric data SPMD_1_1, a first secondary voice representation VR_1_2 based on the first secondary speaker metric data SPMD_1_2, and/or a first tertiary voice representation VR_1_3 based on the first tertiary speaker metric data SPMD_1_3.

The method comprises obtaining (such as retrieving, receiving, and/or determining) first voice validation data, also denoted VVD_1, based on the first voice representation VR_1, from a first validator, also denoted VAL_1. The first validation data VVD_1 may comprise data indicative of whether the first validator VAL_1 agrees with the first voice representation or not. In other words, the first validation data VVD_1 may comprise data indicative of whether the first validator VAL_1 agrees with an output of the voice VM or not, e.g., in view of the first audio data. The first validator may compare the first voice representation with the first audio data. It may be appreciated that the first validation data VVD_1 may comprise an alternative to the first voice representation. The first validation data VVD_1 may comprise data indicative of whether the first validator VAL_1 agrees with the first speaker metric data or not. For example, the first validation data may indicate whether the first validator agrees with one or more of a speaking tone parameter (such as a tone metric), a speech trait parameter (such as a speech trait metric), a vocal trait parameter (such as a vocal trait metric), a sentiment metric, a sentiment type identifier, a sentiment level, a sentiment type, a confidence score of a sentiment metric, and a speaker state. For example, when the first voice representation VR_1 indicates that a sentiment state of the first speaker is negative, the first validation data may comprise a parameter indicating that the first validator agrees that the sentiment state of the first speaker is negative. For example, when the first voice representation VR_1 indicates a sentiment metric comprising a sentiment state of the first speaker being negative, the first validation data may comprise a parameter indicating that the first validator disagrees that the sentiment state of the first speaker is negative. When the first validator disagrees and/or invalidates the first voice representation, the first validator may instead indicate an alternative to the first voice representation. For example, the that the first validator may indicate that the sentiment state of the first speaker is positive. The first validator VAL_1 may be a user validating/annotating his/her own first voice data (such as his own performance). In other words, the first voice may be the voice of the first validator and/or the first voice data may be of the first validator. For example, the first validator may be an agent of a call center assessing/annotating his own voice data, e.g., from one or more conversations performed on the call center. In other words, the first validator may validate (such as annotate) an output of the voice model based on audio data of his own voice. Thus, the first validator receive feedback on self-assessment of his own voice, which in turn improves the validation input to the voice model.

The method comprises obtaining (such as retrieving, receiving, and/or determining) second voice validation data, also denoted VVD_2, based on the first voice representation VR_1, from a second validator, also denoted VAL_2. The second validation data VVD_2 may comprise data indicative of whether the second validator VAL_2 agrees with the first voice representation or not in view of the first audio data. The second validator may compare the first voice representation (such as the first voice data) with the first audio data. In other words, the second validation data VVD_2 may comprise data indicative of whether the second validator VAL_2 agrees with an output of the voice model VM or not. It may be appreciated that the second validation data VVD_2 may comprise an alternative to the first voice representation. The second validation data VVD_2 may comprise data indicative of whether the second validator VAL_2 agrees with the first speaker metric data or not. For example, the second validation data may indicate whether the second validator agrees with one or more of a speaking tone parameter (such as a tone metric), a speech trait parameter (such as a speech trait metric), a vocal trait parameter (such as a vocal trait metric), a sentiment metric, a sentiment type identifier, a sentiment level, a sentiment type, a confidence score of a sentiment metric, and a speaker state. For example, when the first voice representation VR_1 indicates that a sentiment state of the first speaker is negative, the second validation data may comprise a parameter indicating that the second validator agrees that the sentiment state of the first speaker is negative. For example, when the first voice representation VR_1 indicates a sentiment metric comprising a sentiment state of the first speaker being negative, the second validation data may comprise a parameter indicating that the second validator disagrees that the sentiment state of the first speaker is negative. When the second validator disagrees and/or invalidates the first voice representation, the second validator may instead indicate an alternative to the first voice representation. For example, the second validator may indicate that the sentiment state of the first speaker is positive. The second validator VAL_2 may be a second user validating/annotating the first voice data (such as the performance of the first voice). The second validator may comprise one or more users, such as a group of users. The second validator may be a supervisor of the communication system, such as a supervisor of the first validator being an agent/user of the communication system. For example, the second validator may be a supervisor of a call center assessing/annotating the voice data of the first validator, e.g., from one or more conversations performed on the call center where the first validator is present. In other words, the second validator may validate (such as annotate) an output of the voice model based on audio data of the voice of the first validator.

A validator, such as the first validator VAL_1 and/or the second validator VAL_2, may be seen as a validator assessing an output of the voice model and/or voice data. A validator may be seen as a rating person that rates an output of the voice model and/or voice data. A validator may agree, disagree, and/or indicate an alternative to an output of the voice model. In other words, a validator may be seen as a supervisor that validates or invalidates the first voice representation and/or the content of the first voice representation. For example, a validator may be seen as a supervisor that validates or invalidates an output of the voice model. A validator may comprise a human validator and/or a validation model (such as a first validation model and/or a second validation model). The validation model may comprise a ML model. The validation model may comprise a model of higher computational complexity (such as more layers, more parameters, and/or a plurality (ensembles) of models) and/or be trained on different and/or additional audio features, and/or different and/or additional audio data. The validation model may comprise different type of models, different architectures, such as different layers, and/or different parameters, such as different optimum, e.g., due to stochastic optimization. The validation model may work in an offline (non real-time) way due to its higher complexity, and thus form an asynchronous validator for the validation model. Moreover, as it may be trained on different features (e.g., text features derived from transcriptions) it may have a different (obviously, better) performance. The validation model may generate a prediction itself, and then the validation is performed by comparing its prediction with the original model prediction, and/or be trained to return a yes/no answer based on the audio data AD (such as first audio data AD_1, e.g., an audio sample) and a prediction by the validation model.

In one or more exemplary methods, obtaining first voice validation data VVD_1 based on the first voice representation VR_1 from the first validator VAL_1 comprises obtaining a first input I_1 from the first validator VAL_1 via a user interface on an electronic device (such as a first user device, e.g., a first validator device). In other words, the first voice validation data may comprise and/or be a result of the first input. The first voice representation may comprise the user interface. The user interface may be displayed via the electronic device, such as via a display of the electronic device. The first voice representation VR_1 may include an output of the voice model to be validated by the validator and the input to the voice model that the output was based on (such as the first audio data). The first validator VAL_1 may provide the first input I_1 (such as first validator input) in response to the user interface being provided to the first validator. The first input I_1 may be provided by the first validator VAL_1 as a response to a prompt from the electronic device via the user interface. In other words, the first input may be seen as a feedback from the first validator on the first voice representation and/or the first voice data.

The processor of the electronic device may be configured to display, on the interface, e.g., first display, one or more user interfaces, such as user interface screens, including a first user interface and/or a second user interface, e.g., being the first voice representation. A user interface may comprise one or more, such as a plurality of user interface objects. For example, the first user interface may comprise a first primary user interface object and/or a first secondary user interface object. A second user interface may comprise a second primary user interface object and/or a second secondary user interface object. A user interface may be referred to as a user interface screen.

An input, such as the first input I_1 and/or a second input I_2, may comprise a touch (e.g., a tap, a force touch, a long press), a click (such as a mouse click), a typing (such as a typing on a keyboard), an audio recording (such as via a microphone), and/or a movement of contact (e.g., a swipe gesture, e.g., for toggling). The movement on contact may be detected by a touch sensitive surface, e.g., on the first display of the electronic device. Thus, the first display may be a touch sensitive display. The first input (such as first user input) may comprise a lift off. A user input, such as the first input, may comprise a touch and a movement followed by a lift off.

The display of the electronic device may be configured to detect a user input, such as a first input. The user input may comprise a touch input from the user, for example when the first display comprises a touch-sensitive display. The user input may comprise a contact on the touch sensitive display, a keyboard, and/or a mouse comprised in or connected to the electronic device. A touch-sensitive display may provide the user interface (such as an input interface) and an output interface between the electronic device and the user. The processor of the electronic device may be configured to receive and/or send electrical signals from/to touch-sensitive display. A touch-sensitive display may be configured to display visual output to the user, e.g., the first voice representation. The visual output optionally includes graphics, text, icons, video, audio icons, and any combination thereof (collectively termed "graphics"). For example, some, most, or all of the visual output may be seen as corresponding to user-interface objects. The electronic device may also be configured to output first voice representations comprising audio output, such as recording of the first voice, sound representations, audio icons, text output, graphical output, and/or auditory feedback.

In one or more exemplary methods, obtaining second voice validation data VVD_2 based on the first voice representation VR_1 from the second validator VAL_2 comprises obtaining a second input I_2 from the second validator VAL_2 via a user interface on an electronic device (such as a second user device, e.g. a second validator device). In other words, the second voice validation data may comprise and/or be a result of the second input. The first voice representation may comprise the user interface. The user interface may be displayed via the electronic device, such as via a display of the electronic device.

The first voice representation VR_1 may include an output of the voice model to be validated by the validator and the input to the voice model that the output was based on (such as the first audio data). The second validator VAL_2 may provide the second input I_1 (such as second validator input) in response to the user interface being provided to the second validator. The second input I_2 may be provided by the second validator VAL_2 as a response to a prompt from the electronic device via the user interface. In other words, the second input may be seen as a feedback from the second validator on the first voice representation and/or the first voice data, based on the first audio data.

In one or more exemplary methods, obtaining first voice validation data VVD_1 and/or obtaining second voice validation data VVD_2 comprises receiving one or more label parameters characterizing the first audio data AD_1. In other words, the first validator and/or the second validator may provide an input (such as a first input and/or a second input) providing one or more label parameters characterizing the first audio data AD_1. A label parameter may be understood as a label that a validator associates with the first audio data. A label parameter may provide absolute feedback. A label parameter may for example comprise one or more of a speaking tone parameter (such as a tone metric), a speech trait parameter (such as a speech trait metric), a vocal trait parameter (such as a vocal trait metric), a sentiment metric, a sentiment type identifier, a sentiment level, a sentiment type, a confidence score of a sentiment metric, and a speaker state. A validator may for example provide a label parameter via the user interface of the electronic device.

In one or more exemplary methods, obtaining first voice validation data VVD_1 and/or obtaining second voice validation data VVD_2 comprises receiving confirmation data, also denoted CD, indicative of validity or non-validity of the first voice data VD_1. In other words, the first voice validation data VVD_1 and/or the second voice validation data VVD_2 may comprise confirmation data indicative of whether the first validator VAL_1 and/or the second validator VAL_2 agrees with an output of the voice model VM or not in view of the first audio data. The confirmation data CD may be provided by the first input and/or the second input. The confirmation data CD may be seen as feedback from the first validator and/or the second validator on the first voice data and/or the first voice representation. The confirmation data may be seen as implicit feedback, e.g., indicating an assessment of a correct or a wrong output of the voice model from the first validator and/or the second validator. The confirmation data may comprise the one or more label parameters. In one or more exemplary methods, a label parameter may be indicative of validity or non-validity of the first voice data VD_1. For example, when the first voice validation data comprises a label parameter corresponding to a parameter of the first voice data, the label parameter may validate the first voice data. A validator may for example provide the confirmation data via the user interface of the electronic device.

In one or more exemplary methods, the first voice validation data VVD_1 comprises information on whether the first voice data VD_1 satisfies a first validation criterion, also denoted VC_1. In other words, the method may comprise determining whether the first voice data satisfies the first validation criterion. The method may comprise determining whether the first voice data satisfies or fulfills the first validation criterion. When it is determined that the first voice data satisfies the first validation criterion, it may be an indication that the first validator validates (validity) the first voice data. When it is determined that the first voice data does not satisfy the first validation criterion, it may be an indication that the first validator do not validate (non-validity) the first voice data.

In one or more exemplary methods, determining whether the first voice data satisfies a first validation criterion comprises determining whether the first voice data is above, equal to, or below a first threshold or within a first range. When it is determined that the first voice data satisfies the first validation criterion, the first voice data is above the first threshold. When it is determined that the first voice data does not satisfy the first validation criterion, the first voice data may be equal to or below the first threshold.

The first validation criterion may comprise a first model target data. For example, the first validation criterion may comprise a standard speaker score that the first voice data has to fulfill. Determining whether the first voice data satisfies the first validation criterion may comprise determining whether a first speaker score of the first voice data satisfies the first model target data (such as the standard speaker score).

In one or more exemplary methods, the validation criterion, e.g., the first validation criterion, is based on the speaker metric data, e.g., the first speaker metric data. The first validation criterion may be determined based one or more first speaker metrics. For example, when the first speaker metric data comprises a first tone metric, the first validation criterion may comprise the first tone metric. The first tone metric may then be compared to a standard tone metric of the first validation criterion and/or a threshold for the tone metric.

In one or more exemplary methods, the second voice validation data VVD_2 comprises information on whether the first voice data VD_1 satisfies a second validation criterion, also denoted VC_2. In other words, the method may comprise determining whether the first voice data satisfies the second validation criterion. The method may comprise determining whether the first voice data satisfies or fulfills the second validation criterion. When it is determined that the first voice data satisfies the second validation criterion, it may be an indication that the second validator validates (validity) the first voice data. When it is determined that the first voice data does not satisfy the second validation criterion, it may be an indication that the second validator do not validate (non-validity) the first voice data.

A validation criterion, such as the first validation criterion and/or the second validation criterion may comprise one or more parameters that the first voice data, e.g., the first speaker metric data, may be compared to. For example, the first validation criterion and/or the second validation criterion may comprise a speaking tone criterion/parameter, a speech trait criterion/parameter, a vocal trait criterion/parameter, a number parameter (such as a number of validations), and/or a time parameter/criterion (for example a minimum time period that the validator has provided voice validation data for) that the first voice data may be compared to. In other words, the first validation criterion and/or the second validation criterion may comprise one or more conditions to be satisfied by the first voice data. The description of the first validation criterion VC_1 may also apply to the second validation criterion VC_2.

The method comprises determining an agreement metric, also denoted AM, based on the first voice validation data VVD_1 and the second voice validation data VVD_2. Determining an agreement metric may be based on a comparison of the first voice validation data and the second voice validation data. The agreement metric may be seen as a metric indicating whether the first validator and the second validator agree regarding the first audio data. In other words, the agreement metric may be seen as a metric indicating a level of agreement between the first validator and the second validator. Determining an agreement metric may comprise determining an agreement score. An agreement score may be indicative of a score or a probability that the first validator and the second validator agree, based on the first voice validation data and the second voice validation data. The agreement metric may indicate whether the first validator and the second validator have provided the same or similar voice validation data. In other words, the agreement metric may indicate whether the first validator and the second validator have provided the same or similar input, label parameter, and/or confirmation data. The agreement metric may provide an indication of a degree of agreement between the first validator and the second validator. For example, an agreement score may for example be a value or a score between 0 and 1. For example, when the agreement score is 0, the agreement score may indicate that there is an agreement of 0% between the first validator and the second validator. When the agreement score is 0.5, the agreement score may indicate an agreement of 50% between the first validator and the second validator. In other words, the first validator and the second validator may agree on 50% of the first voice data (such as an agreement of 50% between the first voice validation data and the second voice validation data). For example, when the first voice validation data VVD_1 and the second voice validation data VVD_2 comprises binary information and/or categorical information, such as yes/no, the agreement metric may be determined to be 1, AM=1, when the first voice validation data VVD_1 is equal to the second voice validation data, VVD_2, VVD_1=VVD_2. Otherwise, the agreement metric may be determined to be 0, AM=0. For example, when the first voice validation data VVD_1 and the second voice validation data VVD_2 comprises numerical information, such as numbers on a scale, the agreement metric may be determined to be a difference between the second voice validation data VVD_2 and the first voice validation data VVD_1, such as a subtraction of the second voice validation data VVD_2 and the first voice validation data VVD_1, AM=VVD_2−VVD_1.

An agreement metric may be determined based on one or more audio segments or speech samples (such as speech segments). For example, an agreement metric may be determined based on at least 5 audio segments of the first voice, at least 20 audio segments of the first voice, at least 50 audio segments of the first voice, and/or at least 100 audio segments of the first voice. In other words, an agreement metric may be determined based on an aggregation of a plurality of audio segments of the first voice. By aggregating a plurality of audio segments of the first voice, the agreement metric may be based on a larger number of data points and a sufficient distribution of first voice data may be provided (such as a sufficient distribution of first speaker metric data).

In one or more exemplary methods, determining the agreement metric AM is based on a first bias B_1 associated with the first validator VAL_1. In one or more exemplary methods, the method comprises determining a first bias B_1 based on one or more equations. A bias, such as the first bias and/or the second bias, may comprise one or more coefficients, such as bias coefficients. The first bias may be seen as a bias of the first validator, such as a bias of the user annotating/assessing his own first voice. In other words, the first validator may be biased when providing first voice validation data. For example, when the first voice is a voice of the first validator, the first validator may be biased in the annotating/assessment of his own first voice. Determining the agreement metric may comprise applying a first bias B_1 on the first voice validation data. The first bias B_1 may be determined by requiring the user to annotate a set of pre-annotated files (such as pre-annotated audio representations, segments, and/or annotator embeddings) where all or some of the values of each sentiment tone (e.g., {negative, neutral, positive}) appear. A bias may be seen as an implicit annotation calibration for a validator. For example, a validator that tends to validate more negatively than the voice model may have a lower validation precision for the sentiment type identifier "negative", e.g., for the sentiment "negative". A bias may be seen as an annotator's accuracy per tone. The same procedure may be followed when the validator is an ML model. In addition, a bias may be approximated/adapted on-line by counting the mistakes that the first validator makes when the second validator agrees with the model. For example, when the second validator VAL_2 agrees with the voice model, e.g., for the sentiment type identifier being indicative of a sentiment being "negative", but the first validator VAL_1 disagrees with the voice model, then this would count as a mistake of the first validator VAL_1. A running ratio may be kept for the times when the first validator VAL_1 disagrees but the second validator VAL_2 agrees for each sentiment type identifier. This running ratio may define the first bias B_1 and/or the second bias B_2.

In one or more exemplary methods, determining the agreement metric AM is based on a second bias B_2 associated with the second validator VAL_1. In one or more exemplary methods, the method comprises determining a second bias B_2 based on one or more equations. A bias, such as the first bias and/or the second bias, may comprise one or more coefficients, such as bias coefficients and/or one or more weights, such as bias weights. The second bias may be seen as a bias of the second validator, such as a bias of the user/supervisor annotating/assessing the first voice. In other words, the second validator may be biased when providing second voice validation data. Determining the agreement metric may comprise applying a second bias B_2 on the second voice validation data. For example, when the first voice is of the first validator, the first bias may be larger than the second bias. When the second validator is a neutral supervisor/validator, the second validator may be seen as unbiased. The second bias B_2 may be determined by requiring the user to annotate a set of pre-annotated files (such as pre-annotated audio representations, segments, and/or annotator embeddings) where all or some of the values of each sentiment tone (e.g., {negative, neutral, positive}) appear. A bias may be seen as an implicit annotation calibration for a validator. For example, a validator that tends to validate more negatively than the voice model may have a lower validation precision for the sentiment type identifier "negative", e.g., for the sentiment "negative". A bias may be seen as an annotator's accuracy per tone. The same procedure may be followed when the validator is an ML model. In addition, a bias may be approximated/adapted on-line by counting the mistakes that the first validator makes when the second validator agrees with the model. For example, when the first validator VAL_1 agrees with the voice model, e.g., for the sentiment type identifier being indicative of a sentiment being "positive", but the second validator VAL_2 disagrees with the voice model, then this would count as a mistake of the second validator VAL_2.

A running ratio may be kept for the times when the second validator VAL_2 disagrees but the first validator VAL_1 agrees for each sentiment type identifier. This running ratio may define the first bias B_1 and/or the second bias B_2.

For example, when the first voice validation data VVD_1 and the second voice validation data VVD_2 comprises binary information and/or categorical information, such as yes/no, the agreement metric may be determined to be 1, AM=1, when the first voice validation data VVD_1 times the first bias B_1 is equal to the second voice validation data VVD_2 times the second bias B_2, VVD_1*B_1=VVD_2*B_2. Otherwise, the agreement metric may be determined to be 0, AM=0.

For example, when the first voice validation data VVD_1 and the second voice validation data VVD_2 comprises numerical information, such as numbers on a scale, the agreement metric may be determined to be a difference between the second voice validation data VVD_2 times the second bias B_2 and the first voice validation data VVD_1 times the first bias B_1, such as a subtraction of the second voice validation data VVD_2 times the second bias B_2 and the first voice validation data VVD_1 times the first bias B_1, AM=VVD_2*B_2−VVD_1*B_1.

In one or more exemplary methods, determining the agreement metric AM is based on a voice model bias VMB associated with the voice model VM. In one or more exemplary methods, the method comprises determining a voice model bias VMB. The voice model bias may be seen as a bias regarding a voice, such as the first voice, a gender, and/or a language. In other words, the voice model may be biased when applied on the first audio data. The voice model bias may be seen as a bias regarding the first voice. For example, the voice model may be configured according to a model target (such as a model standard). A model target and/or model standard may comprise a target speaking tone, a target speech trait, a target vocal trait (such as a target voice type and/or a target accent), and/or a target sentiment metric (such as a sentiment type identifier, a sentiment level, and/or a sentiment type). When the first voice, such as the first audio data, deviates from a model target and/or model standard, the voice model may be biased based on how the voice model is configured.

For example, when the first voice validation data VVD_1 and the second voice validation data VVD_2 comprises binary information and/or categorical information, such as yes/no, the agreement metric may be determined to be 1, AM=1, when the first voice validation data VVD_1 times the first bias B_1 is equal to the second voice validation data VVD_2 times the second bias B_2 and equal to the first voice representation VR_1 times the voice model bias VMB, VVD_1*B_1=VVD_2*B_2=VR_1*VMB. Otherwise, the agreement metric may be determined to be 0, AM=0.

The voice model bias VMB may be determined by running the voice model based on set of pre-annotated files (such as pre-annotated audio representations, segments, and/or annotator embeddings) where all or some of the values of each sentiment tone (e.g., {negative, neutral, positive}) appear. This may be done offline. The voice model bias may be determined online based e.g., on a ratio where both the first validator VAL_1 and the second validator VAL_2 agree or disagree on a given sentiment type identifier output by the voice model.

A bias may be seen as an implicit annotation calibration for the voice model. For example, when the voice model tends to output sentiment type identifiers that differ from one or both validators, the voice model may have a lower accuracy for that sentiment type identifier. A running ratio may be kept for the times when the first validator VAL_1 and/or the second validator VAL_2 disagree with the voice model for each sentiment type identifier. This running ratio may define the voice model bias VMB.

The voice model bias VMB may be determined based on a group, e.g., gender. This may allow to determine an correct/incorrect ratio for each label/group pair, e.g., negative-female, negative-male, and/or positive-female. This may be computed offline based on available metadata or online based on predictions from other models.

For example, when the first voice validation data VVD_1 and the second voice validation data VVD_2 comprises numerical information, such as numbers on a scale, the agreement metric may be determined to be a difference between the second voice validation data VVD_2 times the second bias B_2 and the first voice validation data VVD_1 times the first bias B_1 plus (such as an addition) the first voice representation VR_1 times the voice model bias VMB, such as a subtraction of the second voice validation data VVD_2 times the second bias B_2 and the first voice validation data VVD_1 times the first bias B_1 plus (such as an addition) the first voice representation VR_1 times the voice model bias VMB, AM=VVD_2*B_2−VVD_1*B_1+VR_1*VMB.

A bias disclosed herein, such as the first bias, the second bias, and/or the voice model bias, may be based on a-priori knowledge about error likelihood and biases of models and validators.

The method comprises determining a first validation score, also denoted VS_1, based on the agreement metric AM. The first validation score may be seen as a score indicating a quality parameter, an impartiality parameter, a trust parameter, and/or an evaluation parameter of the first voice validation data and/or the second voice validation data. The first validation score may be based on the agreement score between the first validator and the second validator. The first validation score may provide feedback to a validator (such as the first validator and/or the second validator) on how he has validated/annotated the first voice data, such as how good he is at validating/annotating. For example, when the first voice is of the first validator, the first validation score may provide feedback to the first validator on how he has assessed his own voice and/or performance. A validator may provide online feedback to the communication system. The first validation score may provide an indication on the quality of self-assessment of a validator, such as to verify whether a validator can validate his own conversations and/or performances. For example, the first validation score may indicate whether a validator, such as the first validator, has provided an honest annotation of the first voice data. The first validation score may be based on the first bias, the second bias, and/or the voice model bias. By providing a first validation score, a more honest validation from a validator may be achieved. Furthermore, the first speaker/user (such as agent) having the first voice and from whom the first audio data is based on, may be more motivated by having a more honest validation. In other words, the first speaker/user may be more motivated to adapt his/her validator bias. In other words, the first speaker/user may be more motivated since the validation of his/her audio data may be more precise and/or more realistic, in turn providing an improved self-assessment of the first speaker. In one or more exemplary methods, the method comprises determining a second validation score VS_2, for the second voice data. In one or more exemplary methods, the first validation score VS_1 is equal to the agreement metric AM. By having a first validation score VS_1 according to the disclosure, an unbiased estimate may be provided (such as a gold standard), e.g., to improve the voice model. In other words, a validation score VS may be seen as the inverse of the validator bias, e.g., for each speaker metric (such as for each label). For example, whenever a validator determines that the audio data comprises a female that is negative, the validator may be wrong 20% of the time. In other words, a validation score VS may be seen as the total agreement metric AM between the first validator VAL_1 and the second validator VAL_2. For example, the first validation score VS_1 may indicate that the first validator VAL_1 agrees with the second validator VAL_2 (such as the first validator's supervisor) 80% of the time.

In one or more exemplary methods, in accordance with a training criterion, also denoted TC, being satisfied, the method comprises training (such as updating) the voice model VM based on the first audio data AD_1 and one or more of the first voice data VD_1, the first voice validation data VVD_1, the second voice validation data VVD_2, and the agreement metric AM, for provision of an updated voice model, also denoted UVM. In other words, the method may comprise determining whether the voice model satisfies the training criterion. The method may comprise determining whether the voice model satisfies or fulfills the training criterion. When it is determined that the voice model satisfies the training criterion, it may be an indication that the voice model needs to be trained and/or re-trained. When it is determined that the voice model does not satisfy the training criterion, it may be an indication that the voice model does not need to be trained and/or re-trained and the method comprises to refrain from training the voice model. For example, when it is determined that the voice model does not satisfy the training criterion, it may be an indication that a voice model performance is satisfying. In one or more exemplary methods, the training criterion comprises a training threshold. In one or more exemplary methods, the determination of whether the voice model satisfies the training criterion is based on determining whether a voice model performance parameter is above the training threshold, such as determining whether a voice model performance score is above the training threshold. For example, when both the first voice validation data and the second voice validation data is indicative of non-validity of the first voice data, the training criterion may be satisfied, and the voice model may be trained.

The training criterion TC may be based on a collection of a certain percentage (X %) of data (such as audio data) for which the first validator VAL_1 and the second validator VAL_2 disagree with the voice model VM. For example, the training criterion TC may be satisfied when the first validator VAL_1 and the second validator VAL_2 disagree with the voice model for at least 1%, at least 2%, at least 5%, at least 10%, at least 20% and/or more of the collected data (such as audio data).

The training criterion TC may be based on a collection of a certain percentage (X %) of data (such as audio data) for which an unbiased validator, such as the first validator VAL_1 having a first bias B_1 indicative of no bias and/or the second validator VAL_2 having a second bias B_2 indicative of no bias, disagree with the voice model. For example, an unbiased validator may disagree with the voice model for certain voice representations (such as for certain speaker metrics), e.g., when a validator is unbiased with respect to a certain sentiment metric and/or a certain gender, then the training criterion TC may be based on voice data for which the validator disagrees with that sentiment metric and/or gender.

The training criterion TC may be based on a collection of a certain percentage (X %) of data (such as audio data) for which a confidence score of the voice model VM is below a certain threshold (such as the training threshold).

The training criterion TC may be based on a collection of a certain percentage (X %) of data (such as audio data) for which a voice representation comprising e.g., sentiment metrics rarely occurring. In other words, the method may comprise to mitigate class imbalance of training data TD (such as initial training data).

For example, when the first voice validation data VVD_1 and the second voice validation data VVD_2 comprises binary information and/or categorical information, such as yes/no, the agreement metric has been determined to be 1, AM=1, (e.g., the first validator and the second validator agrees with each other), and the first voice validation data VVD_1 and the second voice validation data VVD_2 are equal to 1 (e.g., the first validator and the second validator agrees with the first voice data VD_1), the method comprises training (such as updating) the voice model VM.

In one or more exemplary methods, the first voice validation data VVD_1 and/or the second voice validation data VVD_2 comprises numerical information, such as a validation score between 0 and 1, For example, when the first voice validation data VVD_1 and/or the second voice validation data VVD_2 comprises numerical information, such as a validation score between 0 and 1, the agreement metric may be determined to be 0 or 1 with a confidence score and/or an uncertainty. For example, AM=1, (e.g., the first validator and the second validator agrees with each other), and the first voice validation data VVD_1 and the second voice validation data VVD_2 are between 0.5 and 1 (e.g., the first validator and the second validator agrees with the first voice data VD_1), the method comprises training (such as updating) the voice model VM. A confidence score and/or an uncertainty (such as error) of the agreement metric may be determined to be a difference (such as a subtraction) between the first voice validation data VVD_1 and the first voice data VD_1 (e.g., being numerical) times two, plus (such as an addition) the difference (such as a subtraction) between the second voice validation data VVD_2 and the first voice data VD_1 (e.g., being numerical) times two. Written differently Uncertainty (U_1)=(VVD_1−VD_1)*2+(VVD_2−VD_1)*2.

Alternatively and/or additionally, a confidence score and/or an uncertainty (such as error) of the agreement metric may be determined to be an addition of the first voice validation data VVD_1 and the second voice validation data VVD_2, divided by two (such as a division), minus the first voice data VD_1, and the result of this times (such as a multiplication) two. Written differently Uncertainty (U_1)= ((VVD_1+VVD_2)/2−VD_1) 2.

Alternatively and/or additionally, a confidence score and/or an uncertainty (such as error) of the agreement metric may be determined to be the first voice validation data VVD_1 times the first bias B_1 plus the second voice validation data VVD_2 times the second bias B_2, the result of this divided by the first bias B_1 plus the second bias B_2 minus the first voice data, time two. Written differently Uncertainty (U_1)=((VVD_1*VB_1+VVD_2*VB_2)/ (VB_1+VB_2)−VD_1)*2.

The confidence score and/or uncertainty (such as error) may be used to train the voice model. For example, when the confidence score and/or uncertainty (such as error) is above a certain threshold (such as training threshold), the method may comprise training (such as updating) the voice model VM based on the first voice validation data VVD_1, the second voice validation data VVD_2, and/or the confidence score and/or uncertainty.

Otherwise, when the first voice validation data VVD_1 and the second voice validation data VVD_2 are equal to 0 (e.g., the first validator and the second validator do not agree with the first voice data VD_1), the method comprises refraining from training (such as updating) the voice model VM. In other words, when the first validator and the second validator do not agree with the first voice data VD_1, the method may only train the voice model via reinforcement learning, RL, of the voice model. RL may be used, e.g., when a validator provides binary information and/or categorical information, to predict a speaker metric, such as predict a sentiment metric. For example, RL may be used to predict a sentiment metric such as angry, happy, neutral, and/or sad. RL may be used to determine the "honesty" and/or accuracy of the first validator VAL_1, e.g., by comparing the first voice validation data VVD_1 and the second voice validation data VVD_2. RL may be used to determine the instances (such as voice data) where the first validator VAL_1 may provide accurate voice validation data, e.g., based on the first bias B_1. In other words, RL may be used to determine the instances (such as voice data) where the first validator VAL_1 may be trusted. It may be appreciated that the voice model VM may minimize the voice representations (such as amount of times) where the first validator VAL_1 and/or the second validator VAL_2 disagrees with the voice model. Otherwise, when the agreement metric has been determined to be 0, AM=0, (e.g., the first validator and the second validator disagrees with each other), the method comprises refraining from training (such as updating) the voice model VM.

In one or more exemplary methods, the method comprises training the voice model VM based on training data TD based on one or more of the first audio data AD_1, the first voice data VD_1, the first voice validation data VVD_1, the agreement metric AM, and the second voice validation data VVD_2. In other words, the training data TD may comprise one or more of the first audio data AD_1, the first voice data VD_1, the first voice validation data VVD_1, the agreement metric AM, and the second voice validation data VVD_2. In other words, the method may comprise generating training data based on one or more of the first audio data AD_1, the first voice data VD_1, the first voice validation data VVD_1, the agreement metric AM, and the second voice validation data VVD_2, such as one or more of historical first audio data AD_1, historical first voice data VD_1, historical first voice validation data VVD_1, historical agreement metric AM, and historical second voice validation data VVD_2. The training data may be based on one or more stored calls and/or conversations. In one or more exemplary methods, the method comprises storing the training data TD, such as storing the training data on a training database.

In one or more exemplary methods, training the voice model VM comprises updating the voice model VM based on the training data TD for provision of an updated voice model UVM.

In one or more exemplary methods, training the voice model VM comprises determining a candidate voice model CVM based on one or more of the first audio data AD_1, the first voice data VD_1, the first voice validation data VVD_1, the second voice validation data VVD_2, the agreement metric AM, and the first validation score VS_1.

In one or more exemplary methods, training the voice model VM comprises determining whether the candidate voice model CVM satisfies an update criterion UC. The update criterion may be based on one or more of: a mean squared error, MSE, a concordance correlation coefficient, CCC, an anomaly correlation coefficient, ACC, an unweighted average recall, UAR, an expert-informed weighted accuracy score, F1-score, and an unweighted average bias. An unweighted average bias may be used as a metric to measure the voice model bias VMB, for example with regard to a protected variable, such as gender. In one or more exemplary methods, the update criterion comprises an update threshold. In one or more exemplary methods, the determination of whether the candidate voice model satisfies the update criterion is based on determining whether a candidate voice model performance parameter is above the update threshold, such as determining whether a candidate voice model performance score is above the update threshold. When it is determined that the candidate voice model satisfies the update criterion, it may be an indication that the candidate voice model may be used for updating the voice model to provide the updated voice model. When it is determined that the candidate voice model does not satisfy the update criterion, it may be an indication that the candidate voice model is not good enough for updating the voice model, and the method comprises to refrain from updating the voice model with the candidate voice model. For example, when it is determined that the candidate voice model does not satisfy the update criterion, it may be an indication that a candidate voice model performance is not satisfying.

In one or more exemplary methods, the determination of whether the candidate voice model CVM satisfies the update criterion may be performed offline. For example, the determination of whether the candidate voice model CVM satisfies the update criterion may be performed based on test audio data (such as a test set of audio data). A voice representation (such as speaker metric data) may be determined based on the candidate voice model CVM (such as based on the test data) an compared with a voice representation of the voice model VM. In other words, an output of the candidate voice model CVM may be compared with an output of the voice model VM. When the output (such as voice representation) from the candidate voice model CVM is better than the output (such as voice representation) from the voice model VM, the update criterion may be satisfied and the voice model may be updated.

In one or more exemplary methods, the determination of whether the candidate voice model CVM satisfies the update criterion may be performed online. For example, the candidate voice model CVM and the voice model VM may be applied in an alternating manner, such as using A/B testing. For example, the voice model VM may be applied on a first call, and the candidate voice model CVM may be applied on a second call and so on. It may then be determined which of the voice model VM and the candidate voice model the first validator VAL_1 and/or the second validator VAL_2 agree the most with. In one or more exemplary methods, in accordance with determining that the update criterion UC is satisfied, the method comprises updating the voice model VM with the candidate voice model CVM for provision of the updated voice model UVM.

In one or more exemplary methods, the method comprises updating a server voice model, also denoted SVM, on a server device based on the updated voice model UVM. In other words, the training of the voice model may be performed on the server device. The server device may be configured to distribute the server voice model to one or more electronic devices of the communication system.

In one or more exemplary methods, the method comprises transmitting the updated voice model UVM to one or more client applications (such as call center applications) configured to use the voice model VM. For example, the method comprises distributing the updated voice model to one or more electronic devices of the communication system. The one or more electronic devices may be configured to run a client application configured to use the voice model.

A communication system is disclosed. The communication system comprises an electronic device. The electronic device comprises a processor, a memory, and an interface. The electronic device, such as the processor of the electronic device, is configured to perform any of the methods according to this disclosure. The communication system may comprise a server device and an electronic device.

In one or more exemplary communication system, the electronic device is at least partly implemented in a server device.

In one or more exemplary communication system, the electronic device is at least partly implemented in a user device. The user device comprises a processor, a memory, and an interface. The electronic device may be a user device of the communication system. The user device may be seen as a model training device configured to apply and/or run a voice model and/or train a voice model.

The communication system may be configured to obtain, e.g., using the electronic device and/or the server device, audio data representative of one or more voices, the audio data including first audio data of a first voice.

The electronic device may for example comprise one or more of a mobile phone, a computer, and a tablet. The electronic device may for example be a user device, such as a mobile phone or a computer, configured to perform a call between a user and another person. The electronic device may be configured to obtain first audio input, such as first audio input from a conversation or a call between the user and another person. For example, the electronic device may act as call agent device where the user may be an agent, such as an agent of a call center, such as a support call center, an after sales call center, a marketing call center, or a sales call center. The electronic device may for example be a user device, such as a mobile phone or a computer, configured to record first audio input from a first speaker/user (such as an agent), such as record the first speaker speaking or talking. The electronic device may be configured to obtain one or more audio signals, e.g., comprised in the audio data. The electronic device may be configured to generate one or more audio signals, including a first audio signal, e.g., comprised in the first audio data. The first audio signal may be based on the first audio input, and the first audio data may be based on the first audio signal.

In one or more exemplary communication systems, the communication system is configured to obtain, e.g., using the electronic device and/or the server device, first voice data based on the first audio data.

In one or more exemplary communication systems, the communication system is configured to obtain, e.g., using the electronic device and/or the server device, first voice data VD_1 based on the first audio data AD_1.

In one or more exemplary communication systems, to obtain first voice data VD_1 comprises to apply, e.g., using the electronic device and/or the server device, a voice model VM on the first audio data AD_1, the first voice data VD_1 including first speaker metric data SPMD_1. In one or more exemplary communication systems, the communication system is configured to output, e.g., using the electronic device and/or the server device, a first voice representation VR_1 indicative of the first voice data VD_1. In one or more exemplary communication systems, the communication system is configured to obtain, e.g., using the electronic device and/or the server device, first voice validation data VVD_1, based on the first voice representation VR_1, from a first validator VAL_1.

In one or more exemplary communication systems, the communication system is configured to obtain, e.g., using the electronic device and/or the server device, second voice validation data VVD_2, based on the first voice representation VR_1, from a second validator VAL_2.

In one or more exemplary communication systems, the communication system is configured to determine, e.g., using the electronic device and/or the server device, an agreement metric AM based on the first voice validation data VVD_1 and the second voice validation data VVD_2.

In one or more exemplary communication systems, the communication system is configured to determine, e.g., using the electronic device and/or the server device, a first validation score VS_1 based on the agreement metric AM.

In one or more exemplary communication systems, the communication system is configured to output, e.g., using the electronic device and/or the server device, the first validation score VS_1.

The interface of the electronic device may comprise a first display. The processor of the electronic device may be configured to display, on the interface, e.g., first display, one or more user interfaces, such as user interface screens, including a first user interface and/or a second user interface, e.g., being the first voice representation and/or the first validation score. A user interface may comprise one or more, such as a plurality of user interface objects. For example, the first user interface may comprise a first primary user interface object and/or a first secondary user interface object. A second user interface may comprise a second primary user interface object and/or a second secondary user interface object. A user interface may be referred to as a user interface screen.

The communication system may be a system for performing one or more conversations, such as calls between two or more people, such as a conversation in a phone call or a meeting. The communication system may be a system for coaching and/or training one or more users, such as one or more speakers. The communication system may be a system for monitoring, handling, and/or analysing one or more audio signals, such as a speaker talking, e.g., as a monologue or a conversation. The system may be a system for monitoring, handling, and/or analysing one or more audio signals, such as a conversation, e.g., between two or more people, such as a conversation in a phone call or a meeting. The system may for example comprise or act as a call center system for performing calls and/or monitoring, handling, and/or analysing one or more audio signals, such as conversations between two or more people, e.g., a phone call between an agent of the call center system and a customer or caller.

It is to be understood that a description of a feature in relation to method(s) is also applicable to the corresponding feature in the electronic device, server device, and/or communication system.

FIG. 1 schematically illustrates an exemplary communication system, such as communication system 2 according to the present disclosure. The communication system 2 comprises an electronic device 10 and optionally a server device 20. The electronic device 10 comprises a memory 10A, one or more interfaces 10B, and a processor 100.

The server device 20 comprises a memory 20A, one or more interfaces 20B, and one or more processors 20C. A user/first speaker 1A may use the electronic device 10, e.g., being a mobile phone or a computer, for performing or receiving a call, receiving a first voice representation and/or a first validation score, and/or providing voice validation data. The user 1A may for example be a first validator VAL_1. The electronic device may optionally be configured to perform or receive a call from a speaker 1B, e.g., a second speaker. The speaker 1B may use a speaker electronic device 30 for communicating with the user 1A. The speaker 1B may be a second speaker that the first speaker 1A has a conversation with, such as a call over the communication system. The speaker 1B may be a supervisor that the user 1A may communicate with. The speaker 1B may be a second validator VAL_2. The speaker electronic device 30 may additionally and/or alternatively be a second validator electronic device, such as a supervisor electronic device that the second validator VAL_2 may use.

The electronic device 10 may be configured to act as a user device that the user 1A may use for obtaining/outputting a first voice representation and/or a first validation score, and/or providing voice validation data. The electronic device 10 may be configured to act as a user device that the user 1A may use for communicating and/or monitoring a call/conversation with another speaker. The electronic device 10, e.g., the processor 100, is configured to obtain 4, 14 audio data representative of one or more voices, the audio data including first audio data of a first voice. The first audio signal may be obtained 14 from the electronic device 10, e.g., via a network 40 such as a global network, e.g., the internet or a telecommunications network. The first voice may for example be the voice of the user 1A. The audio data may comprise one or more audio signals including a first audio signal. The first audio signal may be obtained 22 from the speaker electronic device 30, e.g., via a network 40 such as a global network, e.g., the internet or a telecommunications network. The audio data, such as the first audio data may be obtained 14 from the server device 20, e.g., via the network 40 such as a global network, e.g., the internet or a telecommunications network. The audio data, such as the first audio data may be obtained from the memory 10A. The electronic device 10, e.g., the processor 10C, is configured to obtain 4, 14 first voice data based on the first audio data. The electronic device 10, e.g., the processor 100, may be configured to obtain first voice data, such as determine first voice data, on the electronic device 10 itself.

The speaker electronic device 30 may be configured to record audio input 32, such as first audio input, from the speaker 1B, such as record the speaker 1B speaking or talking. The electronic device 30 may be configured to obtain one or more audio signals, such as generate one or more audio signals based on the audio input 32, including a first audio signal based on the first audio input. The speaker electronic device 30 may be configured to transmit 22 audio data, such as the first audio signal, to the electronic device 10, e.g., via the network 40. The speaker electronic device 30 may be configured to obtain 24 one or more audio signals from the electronic device 10, e.g., based on user input 4, such as user audio input. The user input 4 may be the user 1A speaking or talking, e.g., the electronic device 10 recording the user 1A speaking or talking. The user 1A may be the first speaker and/or a second speaker.

The communication system 2 is configured to obtain, e.g., using the electronic device 10 and/or the server device 20, audio data AD representative of one or more voices, the audio data AD including first audio data AD_1 of a first voice V_1.

The communication system 2 is configured to obtain, e.g., using the electronic device 10 and/or the server device 20, first voice data VD_1 based on the first audio data AD_1. For example, the electronic device 10 may be configured to obtain, such as using the interface 10B and/or via the network 40, the first voice data VD_1 based on the first audio data AD_1. For example, the server device 20 may be configured to obtain, such as using the interface 20B and/or via the network 40, the first voice data VD_1 based on the first audio data AD_1.

The communication system 2 is configured to obtain first voice data VD_1 comprises to apply, e.g., using the electronic device 10 and/or the server device 20, a voice model VM on the first audio data AD_1, the first voice data VD_1 including first speaker metric data SPMD_1. For example, the electronic device 10 may be configured to apply, such as using the processor 100 and/or via the network 40, a voice model VM on the first audio data AD_1. For example, the server device 20 may be configured to apply, such as using the processor 20C and/or via the network 40, a voice model VM on the first audio data AD_1.

The communication system 2 is configured to output, e.g., using the electronic device 10 and/or the server device 20, a first voice representation VR_1 indicative of the first voice data VD_1. For example, the electronic device 10 may be configured to output 6, such as using the interface 10B and/or via the network 40, a first voice representation VR_1 indicative of the first voice data VD_1. For example, the server device 20 may be configured to output 18, such as using the interface 20B and/or via the network 40, a first voice representation VR_1 indicative of the first voice data VD_1.

The communication system 2 is configured to obtain, e.g., using the electronic device 10 and/or the server device 20, first voice validation data VVD_1, based on the first voice representation VR_1, from a first validator VAL_1. For example, the electronic device 10 may be configured to obtain 4, 14, such as using the interface 10B and/or via the network 40, the first voice validation data VVD_1, based on the first voice representation VR_1, from a first validator VAL_1. For example, the server device 20 may be configured to obtain 16, such as using the interface 20B and/or via the network 40, the first voice validation data VVD_1, based on the first voice representation VR_1, from a first validator VAL_1.

The communication system 2 is configured to obtain, e.g., using the electronic device 10 and/or the server device 20, second voice validation data VVD_2, based on the first voice representation VR_1, from a second validator VAL_2. For example, the electronic device 10 may be configured to obtain 4, 14, such as using the interface 10B and/or via the network 40, the second voice validation data VVD_2, based on the first voice representation VR_1, from a second validator VAL_2. For example, the server device 20 may be configured to obtain 16, such as using the interface 20B and/or via the network 40, the second voice validation data VVD_2, based on the first voice representation VR_1, from a second validator VAL_2.

The communication system 2 is configured to determine, e.g., using the electronic device 10 and/or the server device 20, an agreement metric AM based on the first voice validation data VVD_1 and the second voice validation data VVD_2. For example, the electronic device 10 may be configured to determine, such as using the processor 100, an agreement metric AM based on the first voice validation data VVD_1 and the second voice validation data VVD_2. For example, the server device 20 may be configured to determine, such as using the processor 20C, an agreement metric AM based on the first voice validation data VVD_1 and the second voice validation data VVD_2.

The communication system 2 is configured to determine, e.g., using the electronic device 10 and/or the server device 20, a first validation score VS_1 based on the agreement metric AM. For example, the electronic device 10 may be configured to determine, such as using the processor 100, a first validation score VS_1 based on the agreement metric AM. For example, the server device 20 may be configured to determine, such as using the processor 20C, a first validation score VS_1 based on the agreement metric AM.

The communication system 2 is configured to output, e.g., using the electronic device 10 and/or the server device 20, the first validation score VS_1. For example, the electronic device 10 may be configured to output 6, such as using the interface 10B and/or via the network 40, the first validation score VS_1. For example, the server device 20 may be configured to output 18, such as using the interface 20B and/or via the network 40, the first validation score VS_1.

In one or more exemplary communication systems, to determine the agreement metric AM is based on a first bias B_1 associated with the first validator VAL_1.

In one or more exemplary communication systems, to determine the agreement metric AM is based on a second bias B_2 associated with the second validator VAL_2.

In one or more exemplary communication systems, to determine the agreement metric AM) is based on a voice model bias VMB associated with the voice model VM.

In one or more exemplary communication systems, to obtain first voice data VD_1 based on the first audio data AD_1 comprises to determine, e.g., using the electronic device 10 and/or the server device 20, first speaker metric data SPMD_1 of a first speaker SP_1 based on the first audio data AD_1, the first speaker metric data SPMD_1 including first primary speaker metric data SPMD_1_1. For example, the electronic device 10 may be configured to determine, such as using the processor 100, first speaker metric data SPMD_1 of a first speaker SP_1 based on the first audio data AD_1, the first speaker metric data SPMD_1 including first primary speaker metric data SPMD_1_1. For example, the server device 20 may be configured to determine, such as using the processor 20C, first speaker metric data SPMD_1 of a first speaker SP_1 based on the first audio data AD_1, the first speaker metric data SPMD_1 including first primary speaker metric data SPMD_1_1.

In one or more exemplary communication systems, to obtain first voice validation data VVD_1 based on the first voice representation VR_1 from the first validator VAL_1 comprises to obtain, e.g., using the electronic device 10 and/or the server device 20, a first input I_1 from the first validator VAL_1 via a user interface on an electronic device. For example, the electronic device 10 may be configured to obtain 4, 14, such as using the interface 10B and/or via the network 40, a first input I_1 from the first validator VAL_1 via a user interface on an electronic device.

In one or more exemplary communication systems, to obtain second voice validation data VVD_2 based on the first voice representation VR_1 from the second validator VAL_2 comprises to obtain, e.g., using the electronic device 10 and/or the server device 20, a second input I_2 from the second validator VAL_2 via a user interface on an electronic device. For example, the electronic device 10 may be configured to obtain 4, 14, such as using the interface 10B and/or via the network 40, a second input I_1 from the second validator VAL_1 via a user interface on an electronic device. For example, the speaker electronic device 20 may be configured to obtain 32 a second input I_2 from the second validator VAL_2 via a user interface of the speaker electronic device 20.

In one or more exemplary communication systems, to obtain the first voice data VD_1 comprises to determine, e.g., using the electronic device 10 and/or the server device 20, first speaker metric data SPMD_1 indicative of one or more deficiencies of the first voice V_1. For example, the electronic device 10 may be configured to determine, such as using the processor 10C, first speaker metric data SPMD_1 indicative of one or more deficiencies of the first voice V_1. For example, the server device 20 may be configured to determine, such as using the processor 20C, first speaker metric data SPMD_1 indicative of one or more deficiencies of the first voice V_1.

In one or more exemplary communication systems, to obtain first voice validation data VVD_1 and/or to obtain second voice validation data VVD_2 comprises to receive, e.g., using the electronic device 10 and/or the server device 20, one or more label parameters characterizing the first audio data AD_1. For example, the electronic device 10 may be configured to receive 4, 14, such as using the interface 10B and/or via the network 40, one or more label parameters characterizing the first audio data AD_1. For example, the server device 20 may be configured to receive 16, such as using the interface 20B and/or via the network 40, one or more label parameters characterizing the first audio data AD_1.

In one or more exemplary communication systems, to obtain first voice validation data VVD_1 and/or to obtain second voice validation data VVD_2 comprises to receive, e.g., using the electronic device 10 and/or the server device 20, confirmation data CD indicative of validity or non-validity of the first voice data VD_1. For example, the electronic device 10 may be configured to receive 4, 14, such as using the interface 10B and/or via the network 40, confirmation data CD indicative of validity or non-validity of the first voice data VD_1. For example, the server device 20 may be configured to receive 16, such as using the interface 20B and/or via the network 40, confirmation data CD indicative of validity or non-validity of the first voice data VD_1.

In one or more exemplary communication systems, the first voice validation data VVD_1 comprises information on whether the first voice data VD_1 satisfies a first validation criterion VC_1.

In one or more exemplary communication systems, the second voice validation data VVD_2 comprises information on whether the first voice data VD_1 satisfies a second validation criterion VC_2.

In one or more exemplary communication systems, in accordance with a training criterion TC being satisfied, the communication system 2 is configured to train, e.g., using the electronic device 10 and/or the server device 20, the voice model VM based on the first audio data AD_1 and one or more of the first voice data VD_1, the first voice validation data VVD_1, the second voice validation data VVD_2, and the agreement metric AM, for provision of an updated voice model UVM. For example, the electronic device 10 may be configured to train, such as using the processor 10C, the voice model VM based on the first audio data AD_1 and one or more of the first voice data VD_1, the first voice validation data VVD_1, the second voice validation data VVD_2, and the agreement metric AM, for provision of an updated voice model UVM. For example, the server device 20 may be configured to train, such as using the processor 20C, the voice model VM based on the first audio data AD_1 and one or more of the first voice data VD_1, the first voice validation data VVD_1, the second voice validation data VVD_2, and the agreement metric AM, for provision of an updated voice model UVM.

In one or more exemplary communication systems, the communication system 2 is configured to train, e.g., using the electronic device 10 and/or the server device 20, the voice model VM based on training data TD based on one or more of the first audio data AD_1, the first voice data VD_1, the first voice validation data VVD_1, the agreement metric AM, and the second voice validation data VVD_2. For example, the electronic device 10 may be configured to train, such as using the processor 100, the voice model VM based on training data TD based on one or more of the first audio data AD_1, the first voice data VD_1, the first voice validation data VVD_1, the agreement metric AM, and the second voice validation data VVD_2. For example, the server device 20 may be configured to train, such as using the processor 20C, the voice model VM based on training data TD based on one or more of the first audio data AD_1, the first voice data VD_1, the first voice validation data VVD_1, the agreement metric AM, and the second voice validation data VVD_2.

In one or more exemplary communication systems, the communication system 2 is configured to store, e.g., using the electronic device 10 and/or the server device 20, the training data TD. For example, the electronic device 10 may be configured to store, such as on the memory 10A and/or via the network 40 on the server device 20, the training data TD. For example, the server device 20 may be configured to store, such as on the memory 20A, the training data TD.

In one or more exemplary communication systems, to train the voice model VM comprises updating, e.g., using the electronic device 10 and/or the server device 20, the voice model VM based on the training data TD for provision of an updated voice model UVM. For example, the electronic device 10 may be configured to update, such as using the processor 100, the voice model VM based on the training data TD for provision of an updated voice model UVM. For example, the server device 20 may be configured to update, such as using the processor 20C, the voice model VM based on the training data TD for provision of an updated voice model UVM.

In one or more exemplary communication systems, to train the voice model VM comprises to determine, e.g., using the electronic device 10 and/or the server device 20, a candidate voice model CVM based on one or more of the first audio data AD_1, the first voice data VD_1, the first voice validation data VVD_1, the second voice validation data VVD_2, the agreement metric AM, and the first validation score VS_1. For example, the electronic device 10 may be configured to determine, such as using the processor 100, a candidate voice model CVM based on one or more of the first audio data AD_1, the first voice data VD_1, the first voice validation data VVD_1, the second voice validation data VVD_2, the agreement metric AM, and the first validation score VS_1. For example, the server device 20 may be configured to determine, such as using the processor 20C, a candidate voice model CVM based on one or more of the first audio data AD_1, the first voice data VD_1, the first voice validation data VVD_1, the second voice validation data VVD_2, the agreement metric AM, and the first validation score VS_1.

In one or more exemplary communication systems, to train the voice model VM comprises to determine, e.g., using the electronic device 10 and/or the server device 20, whether the candidate voice model CVM satisfies an update criterion UC, and in accordance with determining that the update criterion UC is satisfied. For example, the electronic device 10 may be configured to determine, such as using the processor 100, whether the candidate voice model CVM satisfies an update criterion UC, and in accordance with determining that the update criterion UC is satisfied. For example, the server device 20 may be configured to determine, such as using the processor 20C, whether the candidate voice model CVM satisfies an update criterion UC, and in accordance with determining that the update criterion UC is satisfied.

In one or more exemplary communication systems, to train the voice model VM comprises to update, e.g., using the electronic device 10 and/or the server device 20, the voice model VM with the candidate voice model CVM for provision of the updated voice model UVM. For example, the electronic device 10 may be configured to update, such as using the processor 10C, the voice model VM with the candidate voice model CVM for provision of the updated voice model UVM. For example, the server device 20 may be configured to update, such as using the processor 20C, the voice model VM with the candidate voice model CVM for provision of the updated voice model UVM.

In one or more exemplary communication systems, the communication system 2 configured to update, a server voice model SVM on a server device based on the updated voice model UVM. For example, the server device 20 may be configured to update, such as using the processor 20C, a server voice model SVM on the server device 20 based on the updated voice model UVM.

In one or more exemplary communication systems, the communication system 2 is configured to transmit, e.g., using the electronic device 10 and/or the server device 20, the updated voice model UVM to one or more client applications configured to use the voice model VM. For example, the electronic device 10 may be configured to transmit 6, such as using the interface 10B and/or via the network 40, the updated voice model UVM to one or more client applications configured to use the voice model VM. For example, the server device 20 may be configured to transmit 18, such as using the interface 20B and/or via the network 40, the updated voice model UVM to one or more client applications configured to use the voice model VM.

In one or more exemplary communication systems, the first speaker metric data SPMD_1 comprises one or more paralinguistic attributes including one or more of a speaking tone attribute and a speaking emotion attribute.

Figure 2A:
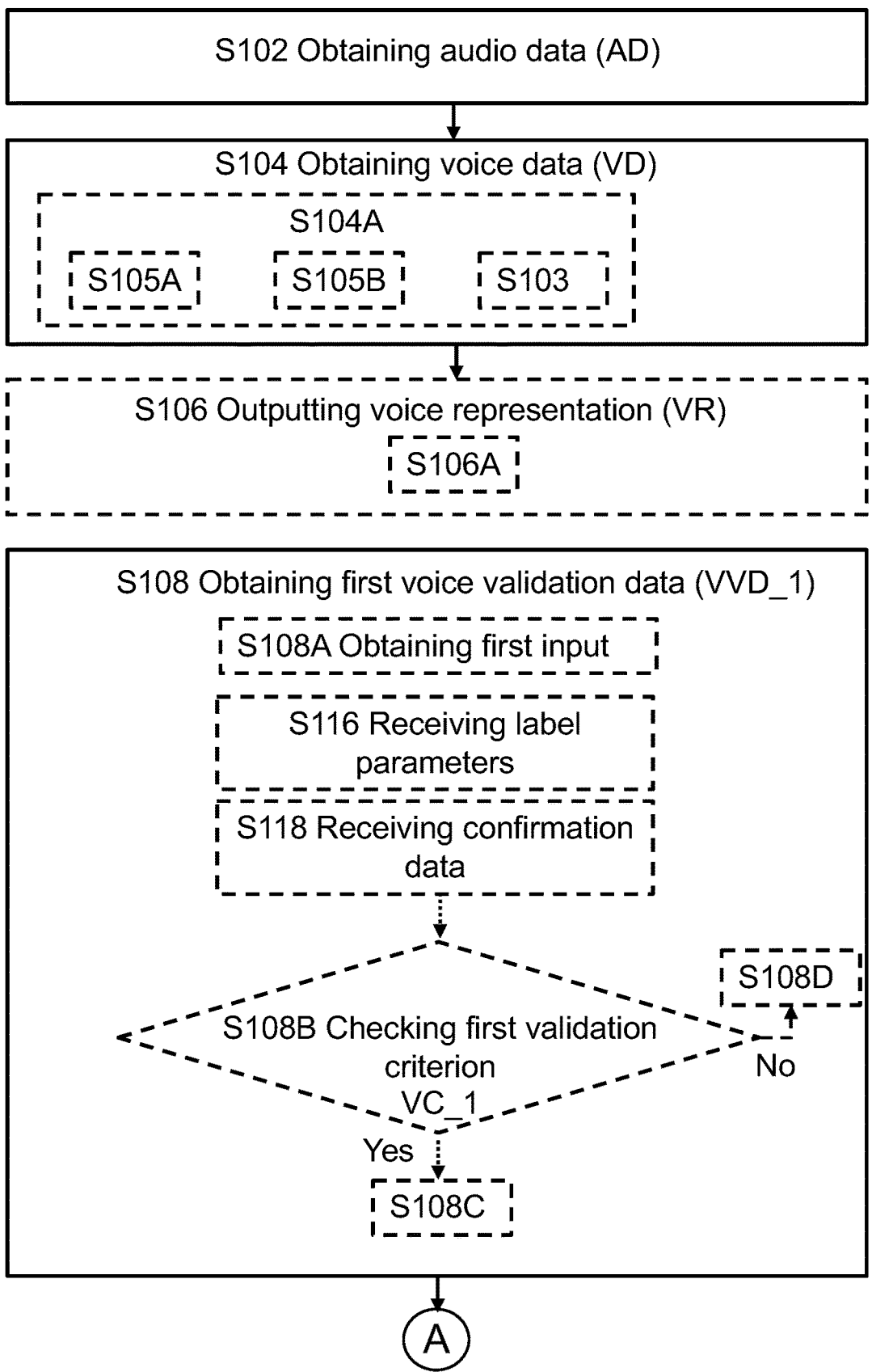
FIGS. 2A-C are flow diagrams of an exemplary method according to the present disclosure.
Figure 2B:
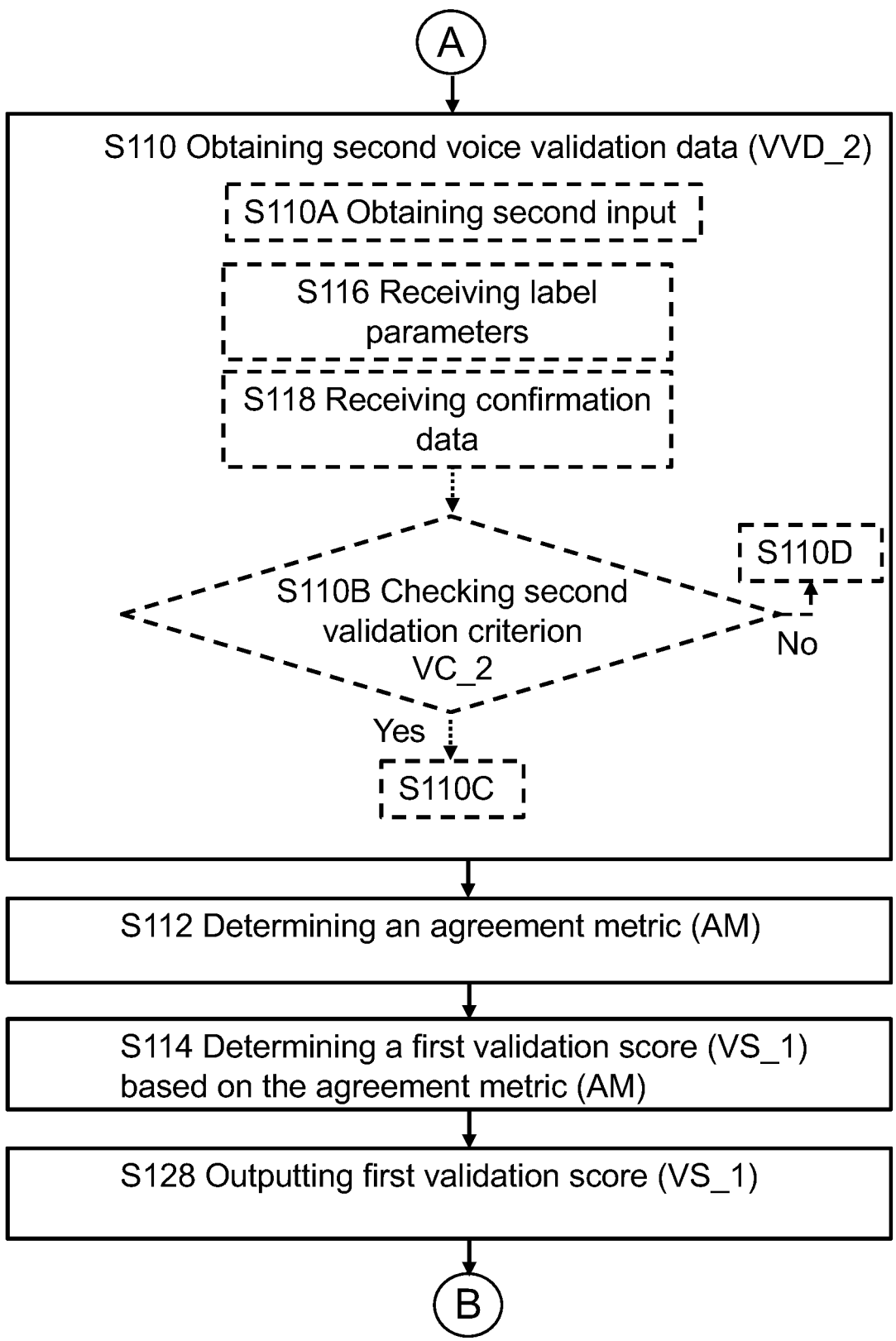
Figure 2C:
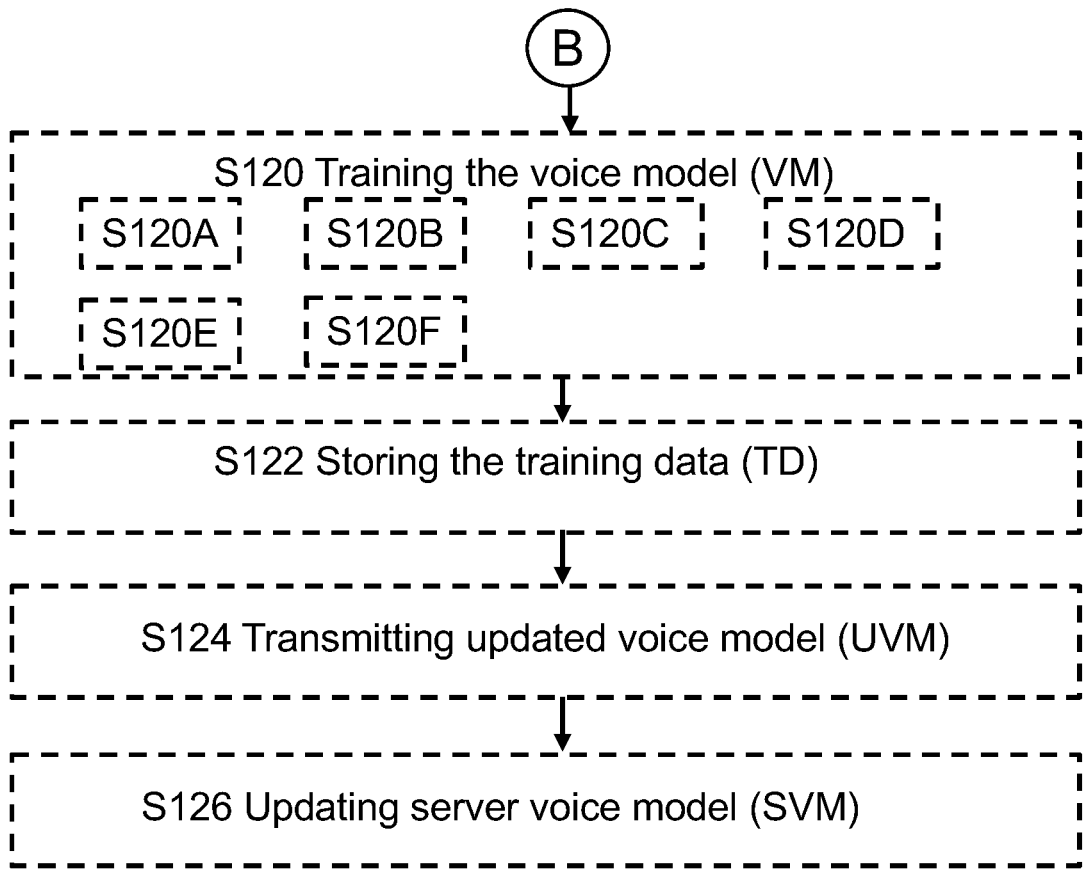

The electronic device 10 and/or the server device 20 may be configured to perform any of the methods disclosed in FIGS. 2A, 2B, and 2C.

The electronic device 10, e.g., the processor 100 is optionally configured to perform any of the operations disclosed in FIGS. 2A-2C (such as any one or more of S103, S105A, S105B, S106, S106A, S108, S108A, S108B, S110A, S110B, S116, S118, 5120A, 5120B, S120C, 5120D, S120E, 5120F, S122, S124, S126). The operations of the electronic device may be embodied in the form of executable logic routines (for example, lines of code, software programs, etc.) that are stored on a non-transitory computer readable medium (for example, memory 10A) and are executed by the processor 10C).

Furthermore, the operations of the electronic device 10 may be considered a method that the electronic device 10 is configured to carry out. Also, while the described functions and operations may be implemented in software, such functionality may as well be carried out via dedicated hardware or firmware, or some combination of hardware, firmware and/or software.

The server device, e.g., the processor 20C, is optionally configured to perform any of the operations disclosed in FIGS. 2A-2C (such as any one or more of S103, S105A, S105B, S106, S106A, S108, S108A, S108B, S110A, S110B, S116, S118, S120A, S120B, S120C, S120D, S120E, 5120F, S122, S124, S126). The operations of the server device may be embodied in the form of executable logic routines (for example, lines of code, software programs, etc.) that are stored on a non-transitory computer readable medium (for example, memory 20A) and are executed by the one or more processors 20C).

Furthermore, the operations of the server device 20 may be considered a method that the server device 20 is configured to carry out. Also, while the described functions and operations may be implemented in software, such functionality may as well be carried out via dedicated hardware or firmware, or some combination of hardware, firmware and/or software.

FIGS. 2A, 2B, and 2C show a flow diagram of an exemplary method. A method 100 of operating a communication system is disclosed.

The method 100 comprises obtaining S102 audio data AD representative of one or more voices, the audio data AD including first audio data AD_1 of a first voice V_1.

The method 100 comprises obtaining S104A first voice data VD_1 based on the first audio data AD_1.

In one or more exemplary methods, obtaining S104A first voice data VD_1 comprises applying S103 a voice model VM on the first audio data AD_1, the first voice data VD_1 including first speaker metric data SPMD_1.

In one or more exemplary methods, the method 100 comprises outputting S106A a first voice representation VR_1 indicative of the first voice data VD_1.

The method 100 comprises obtaining S108 first voice validation data VVD_1, based on the first voice representation VR_1, from a first validator VAL_1.

The method 100 comprises obtaining S110 second voice validation data VVD_2, based on the first voice representation VR_1, from a second validator VAL_2.

The method 100 comprises determining S112 an agreement metric AM based on the first voice validation data VVD_1 and the second voice validation data VVD_2.

The method 100 comprises determining S114 a first validation score VS_1 based on the agreement metric AM.

The method 100 comprises outputting S128 the first validation score VS_1.

In one or more exemplary methods, determining S112 the agreement metric AM is based on a first bias B_1 associated with the first validator VAL_1.

In one or more exemplary methods, determining S112 the agreement metric AM is based on a second bias B_2 associated with the second validator VAL_2.

In one or more exemplary methods, determining S112 the agreement metric AM is based on a voice model bias VMB associated with the voice model VM.

In one or more exemplary methods, obtaining S104A first voice data VD_1 based on the first audio data AD_1 comprises determining S105A first speaker metric data SPMD_1 of a first speaker SP_1 based on the first audio data AD_1, the first speaker metric data SPMD_1 including first primary speaker metric data SPMD_1_1.

In one or more exemplary methods, obtaining S108 first voice validation data VVD_1 based on the first voice representation VR_1 from the first validator VAL_1 comprises obtaining S108A a first input I_1 from the first validator VAL_1 via a user interface on an electronic device.

In one or more exemplary methods, obtaining S110 second voice validation data VVD_2 based on the first voice representation VR_1 from the second validator VAL_2 comprises obtaining S110A a second input I_2 from the second validator VAL_2 via a user interface on an electronic device.

In one or more exemplary methods, obtaining S104A the first voice data VD_1 comprises determining S105B first speaker metric data SPMD_1 indicative of one or more deficiencies of the first voice V_1.

In one or more exemplary methods, obtaining S108 first voice validation data VVD_1 and/or obtaining S110 second voice validation data VVD_2 comprises receiving S116 one or more label parameters characterizing the first audio data AD_1.

In one or more exemplary methods, obtaining S108 first voice validation data VVD_1 and/or obtaining S110 second voice validation data VVD_2 comprises receiving S118 confirmation data CD indicative of validity or non-validity of the first voice data VD_1.

In one or more exemplary methods, the first voice validation data VVD_1 comprises information on whether the first voice data VD_1 satisfies a first validation criterion VC_1. When it is determined that the first voice data satisfies S108C the first validation criterion, it may be an indication that the first validator validates (validity) the first voice data. Optionally, when it is determined that the first voice data does not satisfy S108D the first validation criterion, it may be an indication that the first validator does not validate (non-validity) the first voice data.

In one or more exemplary methods, the second voice validation data VVD_2 comprises information on whether the first voice data VD_1 satisfies a second validation criterion VC_2. When it is determined that the first voice data satisfies S110C the second validation criterion, it may be an indication that the second validator validates (validity) the first voice data. Optionally, when it is determined that the first voice data does not satisfy S110D the second validation criterion, it may be an indication that the second validator do not validate (non-validity) the first voice data.

In one or more exemplary methods, in accordance with a training criterion TC being satisfied, the method 100 comprises training S120A the voice model VM based on the first audio data AD_1 and one or more of the first voice data VD_1, the first voice validation data VVD_1, the second voice validation data VVD_2, and the agreement metric AM, for provision of an updated voice model UVM.

In one or more exemplary methods, the method 100 comprises training S120B the voice model VM based on training data TD based on one or more of the first audio data AD_1, the first voice data VD_1, the first voice validation data VVD_1, the agreement metric AM, and the second voice validation data VVD_2.

In one or more exemplary methods, the method 100 comprises storing S122 the training data TD.

In one or more exemplary methods, training S120 the voice model VM comprises updating S120C the voice model VM based on the training data TD for provision of an updated voice model UVM.

In one or more exemplary methods, training S120 the voice model VM comprises determining S120D a candidate voice model CVM based on one or more of the first audio data AD_1, the first voice data VD_1, the first voice validation data VVD_1, the second voice validation data VVD_2, the agreement metric AM, and the first validation score VS_1.

In one or more exemplary methods, training S120 the voice model VM comprises determining S120E whether the candidate voice model CVM satisfies an update criterion UC, and in accordance with determining that the update criterion UC is satisfied.

In one or more exemplary methods, training S120 the voice model VM comprises updating S120F the voice model VM with the candidate voice model CVM for provision of the updated voice model UVM.

In one or more exemplary methods, the method 100 comprises updating S126 a server voice model SVM on a server device based on the updated voice model UVM.

In one or more exemplary methods, the method 100 comprises transmitting S124 the updated voice model UVM to one or more client applications configured to use the voice model VM.

In one or more exemplary methods, the first speaker metric data SPMD_1 comprises one or more paralinguistic attributes including one or more of a speaking tone attribute and a speaking emotion attribute.

FIG. 3. schematically illustrates an exemplary data structure according to the present disclosure. The audio data AD comprises first audio data AD_1 of a first voice. The audio data AD comprises voice data VD. Optionally, the audio data AD comprises second audio data AD_2 of the first voice. The first audio data AD_1 comprises voice data VD, including first voice data VD_1. Optionally, the second audio data AD_2 comprises voice data VD, including second voice data VD_2. The first voice data VD_1 optionally comprises first speaker metric data SPMD_1, the first speaker metric data SPMD_1 optionally comprising first primary speaker metric data SPMD_1_1. The first voice data VD_1 optionally comprises first deficiency data DD_1. The second voice data VD_2 optionally comprises second speaker metric data SPMD_2, the second speaker metric data SPMD_2 optionally comprising second primary speaker metric data SPMD_2_1. The second voice data VD_2 optionally comprises second deficiency data DD_2.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Memory may be one or more of a buffer, a flash memory, a hard drive, a removable media, a volatile memory, a non-volatile memory, a random access memory (RAM), or other suitable device. In a typical arrangement, memory may include a non-volatile memory for long term data storage and a volatile memory that functions as system memory for the processor. Memory may exchange data with processor over a data bus. Memory may be considered a non-transitory computer readable medium.

Memory may be configured to store information (such as information indicative of the one or more audio signals, the one or more sentiment metrics, the one or more appearance metrics, the speaker representations, the sentiment metric data, and/or the appearance metric data) in a part of the memory.

Furthermore, the labelling of a first element does not imply the presence of a second element and vice versa.

It may be appreciated that FIGS. 1-2 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented.

Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Examples of methods, electronic devices, and communication systems according to the disclosure are set out in the following items:

Item 1. A method of operating a communication system, the method comprising:
   obtaining (S102) audio data (AD) representative of one or more voices, the audio data (AD) including first audio data (AD_1) of a first voice (V_1);
   obtaining (S104A) first voice data (VD_1) based on the first audio data (AD_1), wherein obtaining first voice data (VD_1) comprises applying (S103) a voice model (VM) on the first audio data (AD_1), the first voice data (VD_1) including first speaker metric data (SPMD_1);
   outputting (S106A) a first voice representation (VR_1) indicative of the first voice data (VD_1);

obtaining (S108) first voice validation data (VVD_1), based on the first voice representation (VR_1), from a first validator (VAL_1);
obtaining (S110) second voice validation data (VVD_2), based on the first voice representation (VR_1), from a second validator (VAL_2);
determining (S112) an agreement metric (AM) based on the first voice validation data (VVD_1) and the second voice validation data (VVD_2);
determining (S114) a first validation score (VS_1) based on the agreement metric (AM); and
outputting (S126) the first validation score (VS_1).

Item 2. Method according to item 1, wherein determining (S112) the agreement metric (AM) is based on a first bias (B_1) associated with the first validator (VAL_1).

Item 3. Method according to any of items 1-2, wherein determining (S112) the agreement metric (AM) is based on a second bias (B_2) associated with the second validator (VAL_2).

Item 4. Method according to any of items 1-3, wherein determining (S112) the agreement metric (AM) is based on a voice model bias (VMB) associated with the voice model (VM).

Item 5. Method according to any of items 1-4, wherein obtaining (S104A) first voice data (VD_1) based on the first audio data (AD_1) comprises determining (S105A) first speaker metric data (SPMD_1) of a first speaker (SP_1) based on the first audio data (AD_1), the first speaker metric data (SPMD_1) including first primary speaker metric data (SPMD_1_1).

Item 6. Method according to any of items 1-5, wherein obtaining (S108) first voice validation data (VVD_1) based on the first voice representation (VR_1) from the first validator (VAL_1) comprises obtaining (S108A) a first input (1_1) from the first validator (VAL_1) via a user interface on an electronic device.

Item 7. Method according to any of items 1-6, wherein obtaining (S110) second voice validation data (VVD_2) based on the first voice representation (VR_1) from the second validator (VAL_2) comprises obtaining (S110A) a second input (1_2) from the second validator (VAL_2) via a user interface on an electronic device.

Item 8. Method according to any of items 1-7, wherein obtaining (S104A) the first voice data (VD_1) comprises determining (S105B) first speaker metric data (SPMD_1) indicative of one or more deficiencies of the first voice (V_1).

Item 9. Method according to any of items 1-8, wherein obtaining (S108) first voice validation data (VVD_1) and/or obtaining (S110) second voice validation data (VVD_2) comprises receiving (S116) one or more label parameters characterizing the first audio data (AD_1).

Item 10. Method according to any of items 1-9, wherein obtaining (S108) first voice validation data (VVD_1) and/or obtaining (S110) second voice validation data (VVD_2) comprises receiving (S118) confirmation data (CD) indicative of validity or non-validity of the first voice data (VD_1).

Item 11. Method according to any of items 1-10, wherein the first voice validation data (VVD_1) comprises information on whether the first voice data (VD_1) satisfies a first validation criterion (VC_1).

Item 12. Method according to any of items 1-11, wherein the second voice validation data (VVD_2) comprises information on whether the first voice data (VD_1) satisfies a second validation criterion (VC_2).

Item 13. Method according to any of items 1-12, wherein in accordance with a training criterion (TC) being satisfied, the method comprises training (S120A) the voice model (VM) based on the first audio data (AD_1) and one or more of the first voice data (VD_1), the first voice validation data (VVD_1), the second voice validation data (VVD_2), and the agreement metric (AM), for provision of an updated voice model (UVM).

Item 14. Method according to any of items 1-13, the method comprising training (S120B) the voice model (VM) based on training data (TD) based on one or more of the first audio data (AD_1), the first voice data (VD_1), the first voice validation data (VVD_1), the agreement metric (AM), and the second voice validation data (VVD_2), and storing (S122) the training data (TD).

Item 15. Method according to item 14, wherein training (S120) the voice model (VM) comprises updating (S120C) the voice model (VM) based on the training data (TD) for provision of an updated voice model (UVM).

Item 16. Method according to item 15, wherein training (S120) the voice model (VM) comprises determining (S120D) a candidate voice model (CVM) based on one or more of the first audio data (AD_1), the first voice data (VD_1), the first voice validation data (VVD_1), the second voice validation data (VVD_2), the agreement metric (AM), and the first validation score (VS_1); determining (S120E) whether the candidate voice model (CVM) satisfies an update criterion (UC), and in accordance with determining that the update criterion (UC) is satisfied; updating (S120F) the voice model (VM) with the candidate voice model (CVM) for provision of the updated voice model (UVM).

Item 17. Method according to any of items 15-16, wherein the method comprises updating (S126) a server voice model (SVM) on a server device based on the updated voice model (UVM).

Item 18. Method according to items 13 and/or 15, wherein the method comprises transmitting (S124) the updated voice model (UVM) to one or more client applications configured to use the voice model (VM).

Item 19. Method according to any of items 1-18, wherein the first speaker metric data (SPMD_1) comprises one or more paralinguistic metrics including one or more of a tone metric and a sentiment metric.

Item 20. Method according to any of items 1-19, wherein the first voice is a voice of the first validator.

Item 21. Method according to any of items 1-20, wherein the second validator is a supervisor of the communication system.

Item 22. A communication system (CS) comprising an electronic device configured to perform a method according to any of items 1-21, the electronic device comprising an interface, a processor, and a memory.

Item 23. The communication system according to item 22, where in the electronic device is configured to:
obtain audio data (AD) representative of one or more voices, the audio data (AD) including first audio data (AD_1) of a first voice (V_1);
obtain first voice data (VD_1) based on the first audio data (AD_1), wherein to obtain first voice data (VD_1) comprises to apply a voice model (VM) on the first audio data (AD_1), the first voice data (VD_1) including first speaker metric data (SPMD_1);
output a first voice representation (VR_1) indicative of the first voice data (VD_1);
obtain first voice validation data (VVD_1), based on the first voice representation (VR_1), from a first validator (VAL_1);

obtain second voice validation data (VVD_2), based on the first voice representation (VR_1), from a second validator (VAL_2);
determine an agreement metric (AM) based on the first voice validation data (VVD_1) and the second voice validation data (VVD_2);
determine a first validation score (VS_1) based on the agreement metric (AM); and
output the first validation score (VS_1).

Item 24. Communication system according to any of items 22-23, wherein to determine the agreement metric (AM) is based on a first bias (B_1) associated with the first validator (VAL_1).

Item 25. Communication system according to any of items 22-24, wherein to determine the agreement metric (AM) is based on a second bias (B_2) associated with the second validator (VAL_2).

Item 26. Communication system according to any of items 22-25, wherein to determine the agreement metric (AM) is based on a voice model bias (VMB) associated with the voice model (VM).

Item 27. Communication system according to any of items 22-26, wherein to obtain first voice data (VD_1) based on the first audio data (AD_1) comprises to determine first speaker metric data (SPMD_1) of a first speaker (SP_1) based on the first audio data (AD_1), the first speaker metric data (SPMD_1) including first primary speaker metric data (SPMD_1_1).

Item 28. Communication system according to any of items 22-27, wherein to obtain first voice validation data (VVD_1) based on the first voice representation (VR_1) from the first validator (VAL_1) comprises to obtain a first input (1_1) from the first validator (VAL_1) via a user interface on an electronic device.

Item 29. Communication system according to any of items 22-28, wherein to obtain second voice validation data (VVD_2) based on the first voice representation (VR_1) from the second validator (VAL_2) comprises to obtain a second input (1_2) from the second validator (VAL_2) via a user interface on an electronic device.

Item 30. Communication system according to any of items 22-29, wherein to obtain the first voice data (VD_1) comprises to determine first speaker metric data (SPMD_1) indicative of one or more deficiencies of the first voice (V_1).

Item 31. Communication system according to any of items 22-30, wherein to obtain first voice validation data (VVD_1) and/or to obtain second voice validation data (VVD_2) comprises to receive one or more label parameters characterizing the first audio data (AD_1).

Item 32. Communication system according to any of items 22-31, wherein to obtain first voice validation data (VVD_1) and/or to obtain second voice validation data (VVD_2) comprises to receive confirmation data (CD) indicative of validity or non-validity of the first voice data (VD_1).

Item 33. Communication system according to any of items 22-32, wherein the first voice validation data (VVD_1) comprises information on whether the first voice data (VD_1) satisfies a first validation criterion (VC_1).

Item 34. Communication system according to any of items 22-33, wherein the second voice validation data (VVD_2) comprises information on whether the first voice data (VD_1) satisfies a second validation criterion (VC_2).

Item 35. Communication system according to any of items 22-34, wherein in accordance with a training criterion (TC) being satisfied, the communication system is configured to train the voice model (VM) based on the first audio data (AD_1) and one or more of the first voice data (VD_1), the first voice validation data (VVD_1), the second voice validation data (VVD_2), and the agreement metric (AM), for provision of an updated voice model (UVM).

Item 36. Communication system according to any of items 22-35, wherein the communication system is configured to train the voice model (VM) based on training data (TD) based on one or more of the first audio data (AD_1), the first voice data (VD_1), the first voice validation data (VVD_1), the agreement metric (AM), and the second voice validation data (VVD_2), and to store the training data (TD).

Item 37. Communication system according to item 36, wherein to train the voice model (VM) comprises updating the voice model (VM) based on the training data (TD) for provision of an updated voice model (UVM).

Item 38. Communication system according to item 37, wherein to train the voice model (VM) comprises to determine a candidate voice model (CVM) based on one or more of the first audio data (AD_1), the first voice data (VD_1), the first voice validation data (VVD_1), the second voice validation data (VVD_2), the agreement metric (AM), and the first validation score (VS_1); to determine whether the candidate voice model (CVM) satisfies an update criterion (UC), and in accordance with determining that the update criterion (UC) is satisfied; to update the voice model (VM) with the candidate voice model (CVM) for provision of the updated voice model (UVM).

Item 39. Communication system according to any of items 37-38, wherein the communication system is configured to update a server voice model (SVM) on a server device based on the updated voice model (UVM).

Item 40. Communication system according to any of items 38-39, wherein the communication system is configured to transmit the updated voice model (UVM) to one or more client applications configured to use the voice model (VM).

Item 41. Communication system according to any of items 22-40, wherein the first speaker metric data (SPMD_1) comprises one or more paralinguistic metrics including one or more of a tone metric and a sentiment metric.

Item 42. Communication system (CS) according to any of items 22-41, wherein the electronic device is at least partly implemented in a server device.

Item 43. Communication system (CS) according to any of items 22-42, wherein the electronic device is at least partly implemented in a user device.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 1A user, first speaker, first validator
1B speaker, second speaker, caller, second validator, supervisor
2 communication system
4 input, receive
6 output
10 electronic device 10A memory
10B one or more interfaces
10C processor
12 transmit
14 obtain, receive
16 obtain, receive
18 transmit, output
20 server device
20A memory
20B interface
20C one or more processors
22 transmit
24 obtain
30 speaker electronic device
32 speaker input, audio input
40 network
AD audio data
AD_1 first audio data
AD_2 second audio data
AM agreement metric
AS audio signal
AS_1 first audio signal
AS_2 second audio signal
B_1 first bias
B_2 second bias
CD confirmation data
CVM candidate voice model
DD deficiency data
DD_1 first deficiency data
DD_2 second deficiency data
I_1 first input
I_2 second input
SCS confidence score
SCS_1 first confidence score
SCS_1_1 first primary confidence score
SCS_1_2 first secondary confidence score
SCS_2_1 second primary confidence score
SL sentiment level
SL_1_1 first primary sentiment level
SL_1_2 first secondary sentiment level
SL_2_1 second primary sentiment level
SM sentiment metrics
SM_1 first sentiment metric
SM_1_1 first primary sentiment metric
SM_1_2 first secondary sentiment metric
SM_2 second sentiment metric
SM_2_1 second primary sentiment metric
SM_2_2 second secondary sentiment metric
ST_ID_1_1 first primary sentiment type identifier
ST_ID_1_2 first secondary sentiment type identifier
ST_ID_2_1 second primary sentiment type identifier
ST_ID_2_2 second secondary sentiment type identifier
ST_ID_SET_1 primary set of sentiment type identifiers
ST_ID_SET_2 secondary set of sentiment type identifiers
SMD sentiment metric data
SPMD speaker metric data
SPMD_1 first speaker metric data
SPMD_1_1 first primary speaker metric data
SPMD_1_2 first secondary speaker metric data
SPMD_1_3 first tertiary speaker metric data
SPMD_2 second speaker metric data
SPMD_2_1 second primary speaker metric data
ST_ID sentiment type identifier
ST_ID_1 first sentiment type identifier
ST_ID_1_1 first primary sentiment type identifier
S_ID_1_2 first secondary sentiment type identifier
ST_ID_SET set of sentiment type identifiers
ST_ID_SET_1 primary set of sentiment type identifiers
ST_ID_SET_2 secondary set of sentiment type identifiers
SP_1 first speaker
SP_2 second speaker
SVM server voice model
TD training data
UVM updated voice model
VAL_1 first validator
VAL_2 second validator
VC_1 first validation criterion
VC_2 second validation criterion
VD voice data
VD_1 first voice data
VD_2 second voice data
VM voice model
VMD voice model bias
VR voice representation
VR_1 first voice representation
VS_1 first validation score
VS_2 second validation score
VVD_1 first voice validation data
VVD_2 second voice validation data
100 method of operating a communication system
S102 obtaining audio data
S103 applying voice model
S104 obtaining voice data
S104A obtaining first voice data
S105A determining first speaker metric data
S105B determining first speaker metric data indicative of one or more deficiencies of the first voice
S106 outputting voice representation
S106A outputting first voice representation
S108 obtaining first voice validation data
S108A obtaining first input
S108B checking first validation criterion
S110 obtaining second voice validation data
S110A obtaining second input
S110B checking second validation criterion
S112 determining agreement metric
S114 determining first validation score
S116 receiving label parameters
S118 receiving confirmation data
S120 training voice model
S122 storing training data
S124 transmitting updated voice model
S126 updating server voice model
S128 outputting first validation score

The invention claimed is:

1. A method of operating a communication system, the method comprising:
obtaining audio data representative of one or more voices, the audio data including first audio data of a first voice;
obtaining first voice data based on the first audio data, wherein obtaining first voice data comprises applying a voice model on the first audio data, the first voice data including first speaker metric data;
outputting a first voice representation indicative of the first voice data;
obtaining first voice validation data, based on the first voice representation, from a first validator, wherein the first validator comprises a first human validator;
obtaining second voice validation data, based on the first voice representation, from a second validator, wherein the second validator comprises a second human validator;
determining an agreement metric based on the first voice validation data and the second voice validation data;

determining a first validation score based on the agreement metric; and outputting the first validation score.

2. Method according to claim 1, wherein determining the agreement metric is based on a first bias associated with the first validator.

3. Method according to claim 2, wherein determining the agreement metric is based on a second bias associated with the second validator.

4. Method according to claim 1, wherein determining the agreement metric is based on a voice model bias associated with the voice model.

5. Method according to claim 1, wherein obtaining first voice data based on the first audio data comprises determining first speaker metric data of a first speaker based on the first audio data, the first speaker metric data including first primary speaker metric data.

6. Method according to claim 1, wherein obtaining first voice validation data based on the first voice representation from the first validator comprises obtaining a first input from the first validator via a user interface on an electronic device.

7. Method according to claim 1, wherein obtaining second voice validation data based on the first voice representation from the second validator comprises obtaining a second input from the second validator via a user interface on an electronic device.

8. Method according to claim 1, wherein obtaining the first voice data comprises determining first speaker metric data indicative of one or more deficiencies of the first voice.

9. Method according to claim 1, wherein obtaining first voice validation data and/or obtaining second voice validation data comprises receiving one or more label parameters characterizing the first audio data.

10. Method according to claim 1, wherein obtaining first voice validation data and/or obtaining second voice validation data comprises receiving confirmation data indicative of validity or non-validity of the first voice data.

11. Method according to claim 1, wherein the first voice validation data comprises information on whether the first voice data satisfies a first validation criterion.

12. Method according to claim 1, wherein the second voice validation data comprises information on whether the first voice data satisfies a second validation criterion.

13. Method according to claim 1, wherein in accordance with a training criterion being satisfied, the method comprises training the voice model based on the first audio data and one or more of the first voice data, the first voice validation data, the second voice validation data, and the agreement metric, for provision of an updated voice model.

14. Method according to claim 1, the method comprising training the voice model based on training data based on one or more of the first audio data, the first voice data, the first voice validation data, the agreement metric, and the second voice validation data, and storing the training data.

15. Method according to claim 14, wherein training the voice model comprises updating the voice model based on the training data for provision of an updated voice model.

16. Method according to claim 15, wherein training the voice model comprises determining a candidate voice model based on one or more of the first audio data, the first voice data, the first voice validation data, the second voice validation data, the agreement metric, and the first validation score; determining whether the candidate voice model satisfies an update criterion, and in accordance with determining that the update criterion is satisfied; updating the voice model with the candidate voice model for provision of the updated voice model.

17. Method according to claim 1, wherein the first speaker metric data comprises one or more paralinguistic metrics including one or more of a tone metric and a sentiment metric.

18. Method according to claim 1, wherein the first voice is a voice of the first validator.

19. Method according to claim 1, wherein the second validator is a supervisor of the communication system.

20. A communication system comprising an electronic device configured to perform a method according to claim 1, the electronic device comprising an interface, a processor, and a memory.

* * * * *